United States Patent
Hoshen

[11] Patent Number: 6,108,446
[45] Date of Patent: *Aug. 22, 2000

[54] METHOD AND APPARATUS FOR EXTRACTING CLUSTER SHAPE FEATURES FROM DIGITAL IMAGES

[76] Inventor: Joseph Hoshen, 812 Shiloh Cir., Naperville, Ill. 60540

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,598

[22] Filed: Feb. 18, 1997

[51] Int. Cl.$^7$ ........................................................ G06K 9/62
[52] U.S. Cl. ........................................... 382/225; 382/203
[58] Field of Search .................................. 382/225, 203, 382/204

[56] References Cited

U.S. PATENT DOCUMENTS

| | | | |
|---|---|---|---|
| 4,624,013 | 11/1986 | Urushibata | 382/9 |
| 4,742,551 | 5/1988 | Deering | 382/18 |
| 4,754,490 | 6/1988 | Swonger | 382/18 |
| 4,791,567 | 12/1988 | Cline et al. | 364/413.13 |
| 4,791,675 | 12/1988 | Deering et al. | 382/18 |
| 4,847,786 | 7/1989 | Wang et al. | 364/518 |
| 4,887,302 | 12/1989 | Urushibata | 382/9 |
| 4,901,361 | 2/1990 | Glenn et al. | 382/18 |
| 4,918,739 | 4/1990 | Lorente et al. | 382/1 |
| 4,991,224 | 2/1991 | Takahashi et al. | 382/26 |
| 5,602,938 | 2/1997 | Akiyama et al. | 382/155 |
| 5,696,844 | 12/1997 | Takagi | 382/199 |

OTHER PUBLICATIONS

H. Nakanishi et al., "On the Effectiveness of Superconcurrent Computations on Heterogeneous Networks" *Journal of Parallel and Distributed Computing* 24, 177–190 (1995).

A. Burkitt and D. Heermann, "Parallelization of a Cluster Algorithm" *Computer Physics Communications*, 54 (1989) 201–209.

M. Flanigan, P. Tamayo, Parallel cluster labeling for large–scale Monte Carlo simulations, *Physics A*, 215 (1995) 461–480.

J.M. Constantin, M.W. Berry, and B.T. Vander Zanden, Parllelization of the Hoshen–Kopelman Algorithm Using a Finite State Machine, Submitted to Int. J. of Supercomputer Applications and High Performance Computing 1–32 (to be published 1997).

(List continued on next page.)

*Primary Examiner*—Amelia Au
*Assistant Examiner*—Martin E. Miller
*Attorney, Agent, or Firm*—Cook, Alex, McFarron, Manzo, Cummings & Mehler Ltd.

[57] ABSTRACT

A method and apparatus for extracting cluster shape features in two and three-dimensional images in a single scan is provided. The images, consisting of one or more classes, may be unbounded in one of their dimensions. As an image is scanned, each cluster fragment is assigned with one or more cluster labels. These labels are used to merge the cluster fragments into larger cluster fragments. An enhanced Hoshen-Kopelman algorithm is employed to determine the cluster shape features for the merged cluster fragments. Cluster label reuse is employed to enable the processing of substantially large images including unbounded images. After completing the scanning of an image section, cluster shape features data are outputted for completed clusters that extended into the section previous to said section. Optionally, cluster shape features of cluster fragments and completed clusters that extend into the said section can also be outputted.

22 Claims, 14 Drawing Sheets

OTHER PUBLICATIONS

William K. Pratt, "Chapter 19, Shape Analysis" *Digital Image Processing*, Second Edition, Wiley–Interscience Publication, (1991) pp. 629–650.

W. E. King, et al., "X–ray Tomographic Microscopy Investigation of the Ductile Rupture of an Aluminum Foil Bonded Between Sapphire Blocks," *Scripta Metallurgica et Materialia*, vol. 33, No. 12, pp. 1941–1946.

D. Stauffer and A. Aharony, "A3 Computerized Cluster Counting" *Introduction to Percolation Theory*, Revised Second Edition 1994, pp. 156–168.

J.H. Kinney, et al., in Vivo, Three–Dimensional Microscopy of Trabecular Bone, *Journal of Bone and Mineral Research*, vol. 10, No. 2, 1995, Blackwell Science, Inc. pp. 264–270.

J.H. Kinney, et al. "The X–ray tomographic microscope: three–dimensional prespectives of evolving microstructures," *Nuclear Instruments and Methods in Physics Research*, A 347 (1994) 480–486.

A. Bunde, S. Havlin (eds.), "Hoshen–Kopelman Method", 271 *Fractals and Disordered Systems*, Second Revised and Enlarged Edition, pp. 97–98.

S. Haimov, et al, "Classifiction of Radar Signatures by Autoregressive Model Fitting and Cluster Analysis", *IEEE Transactions on Geoscience and Remote Sensing*, vol. 27, No. 5, Sep. 1989, pp. 606–610.

D.M. Perry et al., Three–dimensional surface metrology of magnetic recording materials through direct–phase–detecting microscopic interferometry, *Journal of the Institution of Electronic and Radio Engineers*, Apr. 1985, vol. 55, No. 4, pp. 145–150.

R. Peterson, et al., Interferometric measurements of the surface profile of moving samples, *Applied Optics*, vol. 23, No. 10, May 1984, pp. 1464–1466.

J. Hoshen and R. Kopelman, "Percolation and cluster distribution. I. Cluster multiple labeling technique and critical concentration algorithm," Oct. 15, 1976, *Physical Review B*, vol. 14, No. 8, pp. 3438–3445.

"X–Ray Tomographic Microscopy" Lawrence Livermore National Laboratory, UCRL–TB 110794 (Mar. 2, 1995).

METHOD AND APPARATUS FOR EXTRACTING CLUSTER SHAPE FEATURES FROM DIGITAL IMAGES

FIELD OF THE INVENTION

The present invention relates to computer-based cluster analysis and image processing apparatus and method.

BACKGROUND OF THE INVENTION

The present invention is an improvement in computational processing for determining percolation and cluster distribution. An introduction to percolation and cluster theory is presented by Stauffer and Aharony, *Introduction to Percolation Theory* (Revised 2d ed. 1994). A "cluster" may be thought of in one sense as a group of features that neighbor one another within a universe, e.g. a lattice. A lattice is a special spatial graph where all the nodes in the graph obey translational symmetry. This means that every node in the lattice has the same surrounding as every other node. In lattice terminology, vertices are known as sites. As an example of a lattice, consider a large array of squares: a given square in the middle of the array has four "nearest neighbors" which each share one side in common with the given square. If a feature is present at a given site and present also at a nearest neighbor site, the two sites are said to be in a cluster. The cluster definition does not have to be restricted to nearest neighbors only. It could include next nearest and other neighbors, also. A cluster may extend throughout the lattice, and it can extend in many dimensions corresponding to the dimensionality of the array. Clusters described in the present invention are also known as connected components and should not be confused with feature space clustering.

Computers lend themselves to cluster analysis. Also, computer-based simulations are often preferable to live experimentation. For example, cluster theory may be useful in determining the consequences of a tree that begins to burn in a forest. If the question is whether a single burning tree will lead to the destruction of the entire forest, and at what rate, depending on how densely packed the other trees are, it would be better from a societal perspective to perform the analysis via a computer simulation rather than by physical experimentation calling for the possible consumption of many forests. Hence, computer analysis is favored. However, as a practical matter, however, computers almost never have sufficient memory space to store the data for an entire lattice or array of sites. It is generally not practical to attempt to load all sites (data points) into memory and analyze the entire universe of data at once.

The Basic Bounded HK ("BBHK") Algorithm

In 1976, my Hoshen-Kopelman (HK) algorithm was published to allow the simulation and study of large lattices without having to store the entire lattice in computer memory. J. Hoshen and R. Kopelman, "Percolation and Cluster Distribution. I. Cluster Multiple Labeling Technique and Critical Concentration Algorithm," *Physical Review B*, Vol. 14, No. 8 (Oct. 15, 1976), which is incorporated by reference. The "HK Algorithm" presented there is frequently cited in literature and used in industry. E.g., Constintin, Berry, and Vanderzanden, "Parallelization of the Hoshen-Kopelman Algorithm Using a Finite State Machine," *J. of Supercomputer Applications and High Performance Computing* (submitted in 1996).

The original HK Algorithm is denoted herein as the Basic Bounded HK (BBHK) algorithm because it was designed to perform cluster analysis on bounded, fixed size lattices in two (2-D) and three (3-D) dimensions. It can also be used for higher dimension lattices and general graphs. The BBHK algorithm was designed to analyze clusters comprising of one type of site. Such types are also referred in the literature as classes. If the BBHK algorithm has to analyze M classes, where M is greater than one, it can do so by performing M passes through the lattice. Pixel images can be viewed as 2-D lattices. Voxels (volume elements) are three dimensional (3-D) lattices. The BBHK algorithm examines data from a bounded lattice in two or three dimensions. For example, a given lattice may include different types of sites A, B, C, etc. which could represent anything—a tree or no tree, an oil particle or no oil, gray level data or white level data, color A or color B or color C, a topographic feature, etc. The BBHK algorithm would provide a distribution of clusters by cluster size for one class only. Two sites would be found to belong to the same cluster if they are the same class and are neighbors.

Comprehensive descriptions and implementations of the BBHK algorithm are given by Stauffer and Aharony, *Introduction to Percolation Theory*, supra, and R. J. Gaylord, P. R. Wellin, *Computer Simulations with Mathematica*. (Springer-Verlag, 1995).

The following is a simple example of how the BBHK algorithm works. Consider the pixel data of FIG. 1(*a*), to be analyzed. It will be appreciated that this collection of data represents an array 100A that has been obtained illustratively by scanning an image area using any type of scanning device, including but not limited to a television camera, optical data digitizer, self-scanned array, arrangement of light emitting diodes, or the like, or in other fashions, and obtaining gray level data. This could come from a pattern recognition system. However, the pixels or array elements need not have come from visually-discernable features. Rather, any features suffice—be they magnetic, gravitational, electrical, nuclear, optical, or otherwise. Illustratively, data for the entire six by six array has been stored and is available for examination.

In FIG. 1(*a*), white and gray pixels are represented. The gray pixels 102 are represented with the letter "G." The white pixels 104 are left blank. The gray pixels will be analyzed for clusters using the BBHK algorithm.

In this example, the BBHK algorithm examines each row of FIG. 1(a) from left to right, and processes the rows sequentially from top to bottom. A site or pixel position is described by (T, L), where T and L denote the position of a pixel by row and column, starting with the top left corner of the lattice. Thus, the top left corner pixel is denoted by (1, 1). The next position to the right is (1, 2) and the position below (1, 1) is (2, 1). In FIGS. 1(*a*)–1(*c*), the algorithm considers no more than the four nearest neighbors for cluster definition.

The BBHK processing starts by examining pixel (1,1). The processor using this algorithm will assign labels as shown in FIG. 1(*b*), which illustrates another array 100B. In general, each distinct cluster (or cluster fragment) will be assigned a label, and the number of pixels within each cluster is to be accumulated as respective population counts. Whether a cluster fragment is deemed a cluster is determined at a later time based on information not yet available. Hence, a cluster "fragment" is a temporary designation. Thus, because pixel (1,1) is gray, the algorithm assigns a label to it—cluster "1" as shown in FIG. 1(*b*) at a position 106*b* corresponding to position (1,1) of FIG. 1(*a*). Also, it increments a software or hardware population counter (not shown) that has been (or will now be) assigned or set up for cluster number 1. Let the population of pixels in cluster number 1 be represented by N(1). Thus, after one pixel N(1)=1.

Proceeding to pixel (1,2), the algorithm finds that this pixel includes the feature of interest (gray level data) and now seeks to establish whether this new site is part of any prior cluster fragment or is a new cluster fragment. By examining the pixel (1,1) to the left, the algorithm determines that pixel (1,2) belongs to cluster fragment 1. Therefore, it labels that second pixel with a "1" (see FIG. 1(b) and increments counter N(1) so that now N(1)=2. The pixel at (1,2) is thus part of the same cluster fragment that includes pixel (1,1).

Continuing to move right within the top row, pixels (1,3) and (1,4) are white value pixels and are skipped; only gray pixels are analyzed for clusters in this example. The next gray pixel is at (1,5). Because pixel (1,4) to its left is a white pixel, the algorithm at this juncture determines that (for now) pixel (1,5) appears to be part of a new cluster fragment. Hence, as shown at 108b, the processor assigns a new label "2" to pixel (1,5) and increments a second counter N(2) to keep track of the number of pixels in cluster fragment number 2. Thus, at this time, N(2)=1. The next pixel is at (1, 6). Because it also is gray, and because pixel (1,5) is gray, the algorithm determines that this sixth pixel belongs to the same fragment cluster number 2 and labels this pixel as "2" and sets N(2)=2. Thus, the top row is completed. Note that no comparisons have been made to any preceding row because this is a border condition and there is no preceding row to the first row. Hence, at the end of scanning the data at the top row, two cluster "fragments" have been identified. It is improper to call them clusters yet, because subsequent processing might show them to be part of the same cluster (and in this case, they are).

The algorithm now proceeds to the second row and skips pixel (2,1) because it is a white pixel. The first gray pixel is at location (2,2). The algorithm now looks to the nearest neighbors above and to the left of pixel (2,2). The pixel immediately above it is (1,2) and it is gray. The pixel to the left is white. Accordingly, the algorithm determines that gray pixel (2,2) belongs to the same cluster fragment as pixel (1,2). Since pixel (1,2) was labeled as part of cluster fragment 1, the algorithm assigns the label "1" to pixel (2,2) also. It now increments the N(1) counter to indicate that there are three pixels in cluster fragment number 1, setting N(1)=3.

The next gray pixel along the second row is at position (2,4). The algorithm looks at the pixels above and to the left and finds that both pixels are white. Hence, the algorithm concludes that this new bit of gray data belongs to a new cluster fragment. Accordingly, as shown at 110b, the processor assigns a new cluster fragment label "3" to this pixel and increments a third counter for cluster fragment number 3, setting N(3)=1.

The next gray pixel 112b is immediately to the right at location (2,5). The algorithm compares it to the pixels above and to the left. In this instance, the pixel above was determined to belong to cluster fragment number 2, as shown at 108b, and the pixel to the left was labeled as belonging to cluster fragment number 3, as shown at 110b. This next pixel (2,5) apparently belongs to "both" cluster fragments. However, it is now seen that "both" cluster fragments are really part of one single cluster ("they" have contiguous edges). By convention, preference is given to the smaller number as the label, and pixel (2,5) is thus labeled as belonging to cluster fragment number 2. The counter N(2) for cluster fragment number 2 is incremented. The gray pixel 110b at position (2,4) is not relabeled from "3" to "2". Cluster fragment number 3 had only one count so that single count also is added to the count for cluster fragment number 2. Hence, at this point, N(2)=4. Before proceeding much further, because the BBHK algorithm has now determined that cluster fragment 3 belongs with cluster fragment 2, a record must be made so that if another label "3" is later encountered, the site should be regarded as part of cluster fragment 2. To do this, a negative number is loaded into the population counter for cluster fragment 3. In this instance, the algorithm sets N(3)=−2, where the −2 denotes that label 3 points to label 2.

The last pixel in row 2 is at location (2,6) and has gray data. Both its neighbor above and its neighbor to the left have been labeled as belonging to cluster fragment 2, and accordingly this pixel also is labeled as belonging to cluster fragment 2. The population counter for cluster fragment number 2 is again incremented, and now N(2)=5.

The examination by the processor using the BBHK algorithm continues until the entire six by six lattice has been examined. A new cluster fragment is apparently encountered at position (3,1) and is assigned label 4. However, the next gray pixel is at position (3,2) and is found to be adjacent to pixels that have been labeled as belonging to cluster fragment number 1 and cluster fragment number 4. Accordingly, by the convention mentioned above, pixel (3,2) is labeled as belonging to cluster fragment number 1, as shown at 114b. The number count from cluster fragment number 4 is added to the number count (population count) for cluster fragment number 1 so that N(1)=5. Also, the algorithm adjusts the contents of the fourth counter so that N(4)=−1, indicating that cluster fragment 4 points to cluster fragment 1. Pixel (3,3) is gray and adjacent to a cluster fragment number 1 site, so it is labeled as belonging to cluster 1.

Pixel (3, 4) is gray and is found to be adjacent to sites of cluster fragment number 1 and cluster fragment number 3. By convention, this pixel is assigned to cluster fragment number 1, and the population count for cluster fragment number 3 is now added to cluster fragment number 1. However, the record at this moment indicates that the population count for cluster fragment number 3 equals minus two (N(3)=−2). This indicates that cluster fragments 3 and 2 have previously merged. Hence, the population count for cluster fragment number 2 (which includes the count for cluster fragment 3) is now added to the population count for cluster fragment number 1. Moreover, giving preference to the lower number as a general rule, the population count for cluster fragment number 3 is reset to equal (−1) and the population count for cluster fragment number 2 is also set to equal (−1). At the end of the third row, it will be seen that although four apparently distinct cluster fragments were encountered, it has now been determined that they all belong to a single cluster. Further, the population of this larger cluster, labeled as number 1, includes 12 pixels. Thus, N(1)=12. It will be seen in FIG. 1(a) that there are no other gray pixels that have an adjacent edge to any pixel that belongs to cluster number 1. During the scanning of the fourth, fifth, and sixth rows, (apparently) new cluster fragments 5, 6, and 7 are encountered and labeled. Hence, array 100B shows labels 1 through 7.

At the end of the examination of the entire six by six lattice 100A, the BBHK algorithm has loaded data into seven (population) counters N(k): N(1)=12, N(2)=−1, N(3)=−1, N(4)=−1, N(5)=10, N(6)=−5, and N(7)=−5. The counters that have positive numbers correspond to cluster (fragment) numbers 1 and 5, and they provide the cluster numbers for the lattice. This six by six array has been found to have just two clusters, and their sizes (populations) are 12 and 10. Labels 1 and 5 are denoted as the "proper" labels of the clusters because they carry the cluster population number information. The other labels are direct or indirect pointers to the proper labels. The fact that a counter fails to give a "proper" label is indicated by the fact that a negative number is stored in the counter. The magnitude of that number is the label being pointed to (which may identify a cluster).

The prior art BBHK algorithm also describes that labels can be reused. In the previous example, the computer memory needed to store the information on all 36 pixels, i.e., all six rows. While this is feasible for small lattices, it becomes much more unwieldy and exhausts the computer memory capabilities when extremely large lattices need to be analyzed. Thus, by the BBHK algorithm technique of reusing or recycling labels, much less memory is required. This technique is illustrated with regard to FIG. 1(c), which shows an array 100C. In this variation, the computer needs to store only two rows, each of size six, at a single time and reuse the labels. For this example, the processor can assign {1, 2, 3} as the label set for the odd lines and the labels {4, 5, 6} for the even lines, realizing that because each row has only six elements, the maximum number of labels that could be needed for any row would result from the alternating pattern 0-1-0-1-0-1, calling for at most only three labels per row. Using the labeling recycling, intermediate cluster results are collected whenever a row is completed. The cluster tally results are taken for the row just prior to the completed row.

The first row in FIG. 1(c) is labeled exactly as the top row in FIG. 1(b). However, the second row is labeled by the label set {4, 5, 6}. In this instance, all clusters found in row 1 will next be found to belong to clusters in row 2. Accordingly, all the labels from row 1 will be updated to point from row 1 to the labels of row 2. Hence, the processor sets N(1)=−4 and accumulates the total number of pixels for cluster number 4, i.e., N(4)=3. Likewise, the computer sets N(2)=−5 and N(5)=5. Now, when the processor finishes with row 2, it can forget row 1 because all the labels from row 1 point to labels in row 2, and it will never encounter row 1 again. Additionally, note that none of the clusters of row 1 are complete because the population counts (N) are all negative and point to row 2.

The third row will reuse labels {1, 2, 3}. The algorithm now sets N(4)=−1, N(5)=1, and N(1)=12. Again, clusters of row 2 are found to be incomplete because the population counts are all negative.

Proceeding to row 4, the two gray pixels will be assigned the (recycled) label for cluster number 4, and N(4)=2. Now, inspecting the labels of row 3, the algorithm notes that the population count for the sole cluster is a positive integer, i.e. N(1)=12, which implies that this cluster number 1 is complete and does not extend to row number 4. Hence, it can be tallied.

The algorithm follows the same procedure for row 5, recycling again the labels from the label set {1, 2, 3}. At the end of row 5, the algorithm has set population counters as follows: N(4)=−2, N(2)=5, and N(1)=1. Note that the cluster label "1" is used again in row 5, even though it was used in rows 1 and 3.

For the sixth row, the algorithm assigns cluster labels from the label set {4, 5, 6}. In this instance, at the end of row 6, the algorithm has determined N(4)=10, N(1)=−4, and N(2)=−4. Hence, there are no complete clusters for row 5. Further, since row 6 is the last row, the processor knows that N(4) is complete. Hence, using the approach of label recycling, in the six by six lattice, the processor using this algorithm identified and tallied two clusters having populations 12 and 10—exactly the same result as obtained with reference to FIG. 1(b). Note that array 100C used only four labels {1, 2, 4, 5,} and that labels 3 and 6 were not required.

The BBHK algorithm has found application in many areas. One technology is X-ray microscopic tomography, in which a sample is divided into vertical cuts. In each plane, the sample is scanned from several angles. For each angle, the fraction of X-ray energy that is absorbed is measured. Using the multiple absorption data, the absorptivity coefficient of each voxel in the cut is determined. The variation in absorptivity between voxels creates the image. To create discrete classes for voxels, the absorptivity is partitioned into ranges, where each range corresponds to a different class. See, e.g. Kinney et al., "The X-ray Tomographic Microscope: Three Dimensional Perspectives Of Evolving Microstructures," *Nuclear Instruments and Methods in Physics Research A* 347 (North-Holland 1994) pp. 480–486; Kinney et al., "In Vivo, Three Dimensional Microscopy Of Trabecular Bone," *J. of Bone and Mineral Research*, Vol. 10, No. 2 (Blackwell Science 1995) pp. 264–270; and King et al., "X-ray Tomographic Microscopy Investigation Of The Ductile Rupture Of An Aluminum Foil Bonded Between Sapphire Blocks," *Scripta Metallurgica et Materialia*, Vol. 33, No. 12 (Elsevier Science/Acta Metallurgica 1995) pp. 1941–1946; all of which are incorporated by reference.

The BBHK algorithm enumerated cluster populations in a bounded lattice or array. While proven to have wide-ranging applications, the prior algorithm fundamentally determined cluster population only. In the 20 years since the HK algorithm was introduced, it has not been extended for the calculations of interest in shape analysis.

Moreover, the BBHK algorithm was inherently constrained by size and was not able to analyze data that is unbounded in at least one dimension.

Furthermore, the BBHK algorithm cannot handle more than one class in a single pass through the lattice. The present invention addresses such issues.

SUMMARY OF THE INVENTION

The present invention applies to all prior applications of the BBHK algorithm, and accordingly applies to all technologies mentioned already, which is not an exhaustive listing. The invention concerns a cluster analysis computer and method, and an image processing system and method, useful for the analysis of data that may or may not contain clusters. Such data may be obtained illustratively from inspecting items in production or use, in pattern recognition, and pattern detection and image analysis. Data may be obtained from sensing organic tissue (e.g. human or animal), inorganic matter, a workpiece, or item(s) under inspection, although in other applications, the data may be simulated. The invention uses computer algorithms to process the data and report the findings.

The cluster analysis computer and image processing system of the present invention determines one or more aspects of clusters among the data. The clusters may represent defects in the workpiece, fissures in solid objects or objects subject to fissures, topological or topographical features from aerial or space observation, chemically bonded molecules or atoms, surface features of a workpiece such as magnetic tape or the like, crystalline structures, anomalies in bodies where the sensing method involves radiology or tomography or other medical processes that seek anomalies in human or other bodies, and numerous other applications.

One independent aspect of the present invention is an "Enhanced HK" (EHK) algorithm that provides the analysis tool to evaluate cluster parameters other than population count for a single class. Such parameters may include, for example, cluster moments. Importantly, whereas the prior art required multiple passes to determine multiple classes, the EHK algorithm allows a single pass analysis of multiple classes.

A separate and independent feature of the present invention is an "Unbounded HK" (UHK) feature which allows cluster parameter calculations for an unbounded lattice.

The EHK and UHK features can be combined to form an enhanced unbounded HK ("EUHK") algorithm. In the unbounded method, a multidimensional lattice where at least one of the coordinates is not constrained by size can nevertheless be examined continuously and indefinitely.

A further feature of the present invention is that this analysis tool can still be applied to non-lattice graphs. Indeed, the EHK can be used with algorithms that join two labeled cluster fragments and is not restricted to lattice graphs.

Several summary aspects of the present invention are as follows:

(1) The origin of cluster image data could be transferred to memory from any sensory device, mass storage such as disk, or be generated by the computer through prior art methods.

(2) Sites are stored in data structures in memory. The position of a site can be inferred form the sites' data structure. The site data structure also defines the class of the site.

(3) For each site i, $f^{(n)}(i)$ properties are defined, where n defines the type of property. For each site there could be one or more such properties.

(4) Each cluster is composed of sites. For a site to be a member of an existing (already-found) cluster, it has to be a neighbor of one member of the cluster and it must be of the same class t of other members of the cluster.

(5) Clusters and cluster fragments are represented by their class identifier and a set of labels. Of the set of labels, one label k is considered to be the proper label of the cluster. The other labels of the cluster point directly or indirectly to the proper label. By the present invention, associated with this label are cluster parameters $F^{(n)}(k, t)$, where the term $F^{(n)}(k,t)$ denotes a cumulative property of the site $f^{(n)}(i)$ property for sites of class t belonging to the cluster.

(6) When the sites are scanned in memory and site i is found not to have neighbor sites of the same class or that its neighbor sites have not been labeled yet, a new cluster label k is created by prior art for that cluster. By the present invention, its $F^{(n)}(k; t)$ parameter is initialized to the site i $f^{(n)}(i)$ property.

(7) When the sites are scanned in memory and a site i is found to have neighbor sites of the same type and that its neighbor sites are already labeled, that site is merged with the cluster fragment to which these members belong. Merging of clusters is known in the prior art. By the prior art technique, the proper labels of each of the cluster fragments is determined and a new proper label p is determined for the merged cluster. The value of p can be either one of the proper labels of the cluster fragments or it can be a new label. By the present invention, the cumulative property $F^{(n)}(p,t)$ of the merged cluster is determined by a performing a successive general binary operation $\oplus$ on the cluster fragments. If there are m cluster fragments denoted by the $k_1, k_2, \ldots, k_m$ cluster labels where each label is distinct, a cumulative value for the merged cluster is evaluated as follows by the present invention:

$F^{(n)}(k_1,t) \oplus F^{(n)}(k_2,t) \oplus \ldots \oplus F^{(n)}(k_m,t) \oplus f^{(n)}(i)$. That value is stored in $F^{(n)}(p,t)$. The operation $\oplus$ is required to be commutative and associative. It can represent scalar or vector addition, scalar multiplication, set union, set intersection, selection of a maximum or minimum value of its operands, or other operations.

(8) The output of the analysis could be the $F^{(n)}(p,t)$ parameters and other parameters that can be derived from the $F^{(n)}(p,t)$ parameters. The output can be printed, displayed on a console, or stored in a mass storage device.

(9) Moreover, in a special case according to the present invention, the $f^{(n)}(i)$ quantity can represent $x(i)^a\ y(i)^b\ z(i)^c$ where x(i), y(i), z(i) represents the x,y,z coordinates of the i'th site and a,b,c are non-negative integer exponents. Here the operation $\oplus$ would denote the normal addition operation. The $F^{(n)}(p,t)$ parameter would be cluster moments for x, y, and z.

(10) In another special case according to the present invention, the $f^{(n)}(i)$ quantity is 1 if its on cluster perimeter, otherwise it is 0. The operation $\oplus$ would denote the normal addition operation. The $F^{(n)}(p,t)$ parameter would be the count for the cluster perimeter sites.

(11) In another special case according to the present invention, the $f^{(n)}(i)$ quantity represents x(i), the x coordinate of the i'th site. The operation $\oplus$ would denote selection of the maximum value of the operands. $F^{(n)}(,pt)$ denotes the maximum x coordinate value for the cluster. Similarly, another $\oplus$ could define the selection of the minimum value of its operands. In that case, $F^{(n)}(p,t)$ would denote the minimum x value for the cluster. By repeating these operands for y and z, the method and apparatus would obtain the bounding box for the cluster.

(12) In another special case according to the present invention, the $f^{(n)}(i)$ quantity represents the number of neighbor sites of site i that already have been scanned. The operation $\oplus$ would denote the normal addition operation. $F^{(n)}(p,t)$ would denote the number of the cluster's internal edges.

(13) In still another special case according to the present invention, the $f^{(n)}(i)$ quantity represents the number of non-neighbor sites of site i. The operation $\oplus$ would denote the normal addition operation. $F^{(n)}(p,t)$ would denote the number of edges from the cluster perimeter sites pointing to non-cluster sites.

BRIEF DESCRIPTION OF THE DRAWINGS AND APPENDICES

In describing the detailed embodiments of the present invention, reference is made to accompanying drawings and appendices, wherein:

FIG. 1(a) represents gray pixel data to be analyzed and FIGS. 1(b) and 1(c) are both developed from FIG. 1(a) using the prior art HK algorithm, but FIG. 1(c) is developed using HK label recycling;

Figures 11A, 11B, 11C:
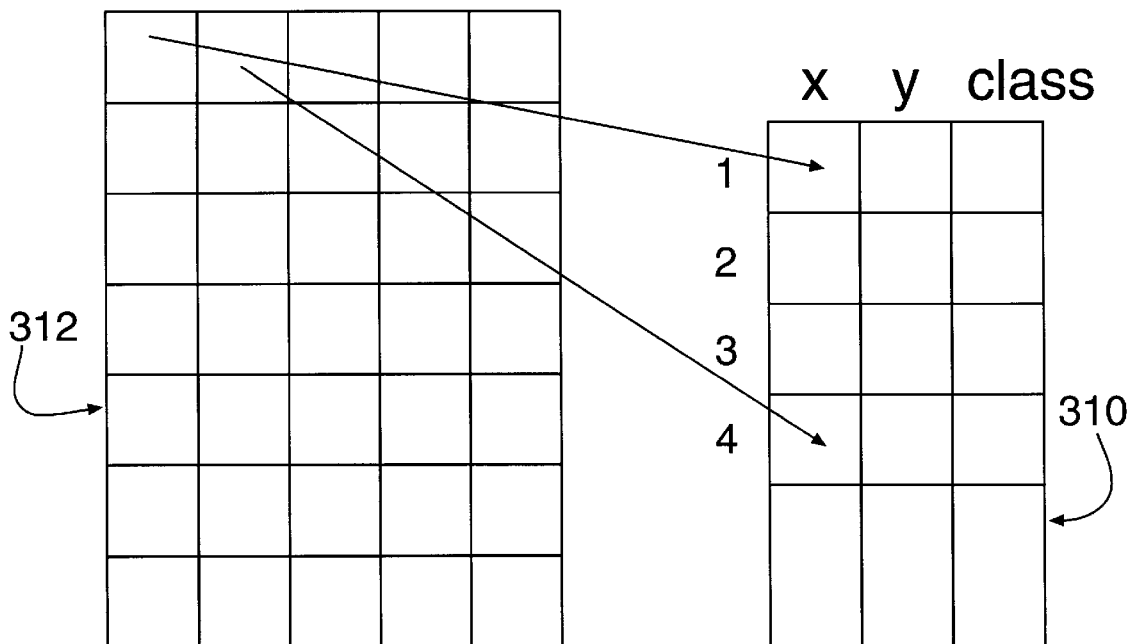
Figure 12A:
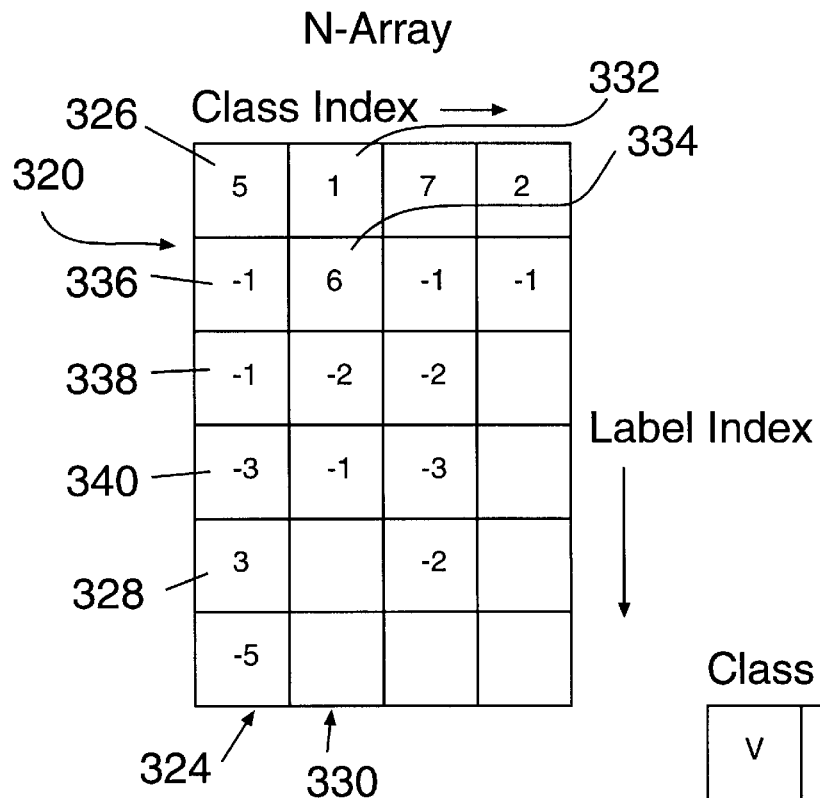
Figure 12B:
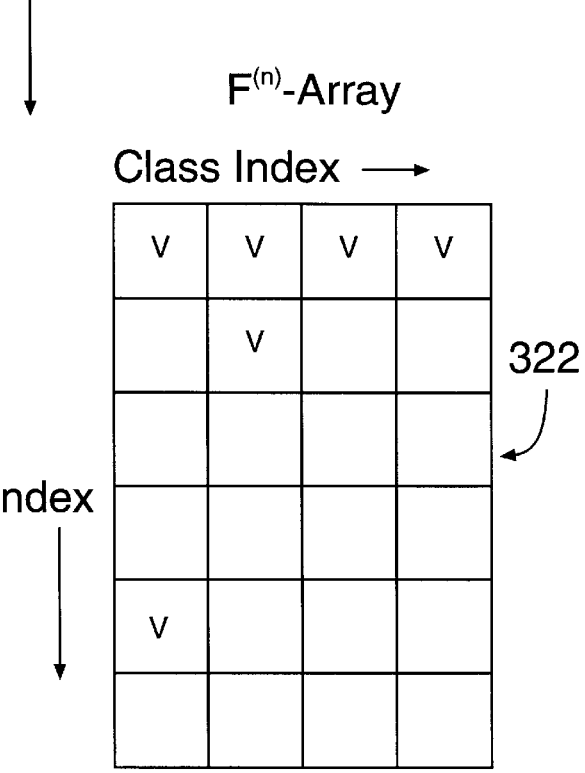
Figure 13:
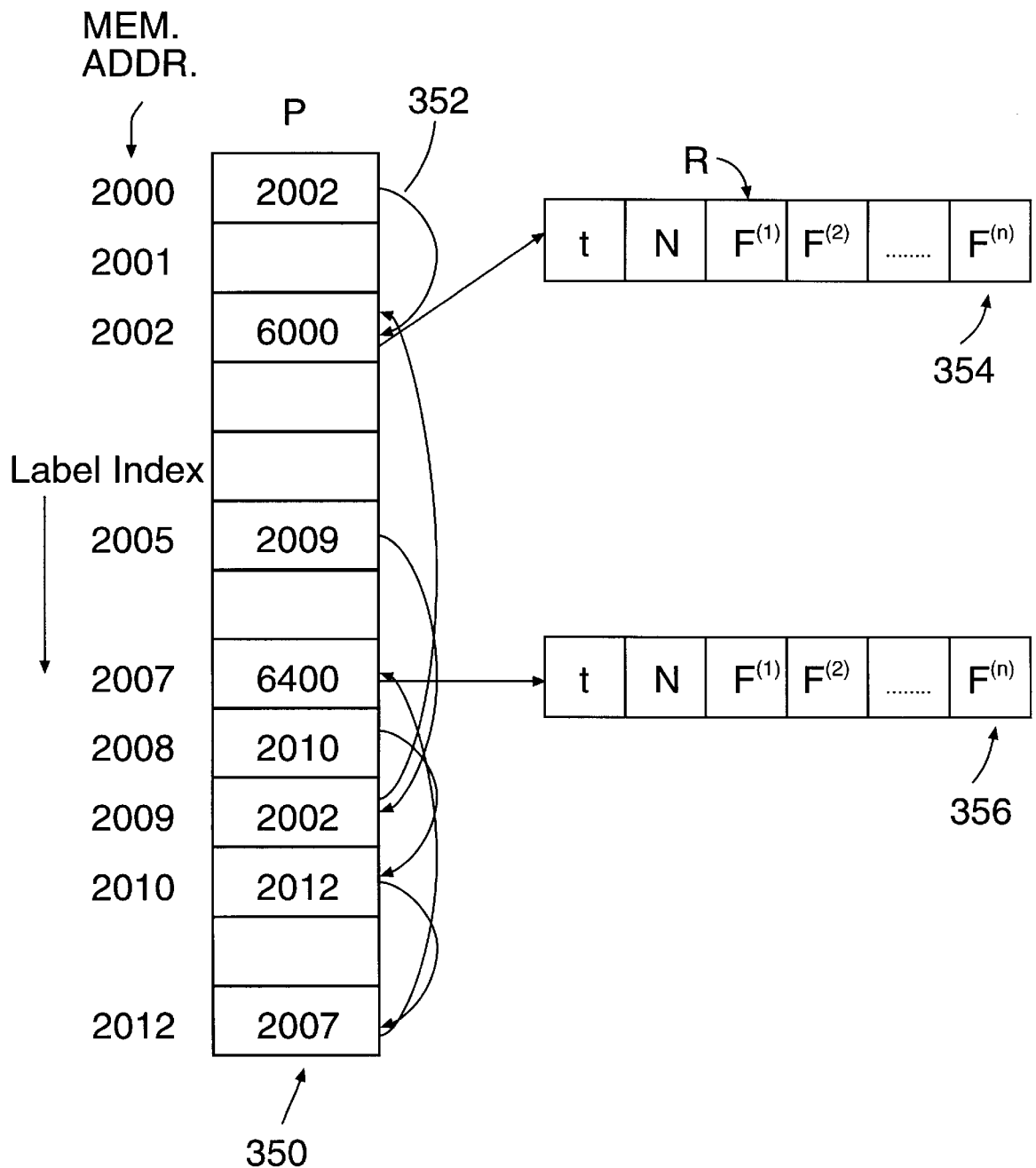
Figure 14:
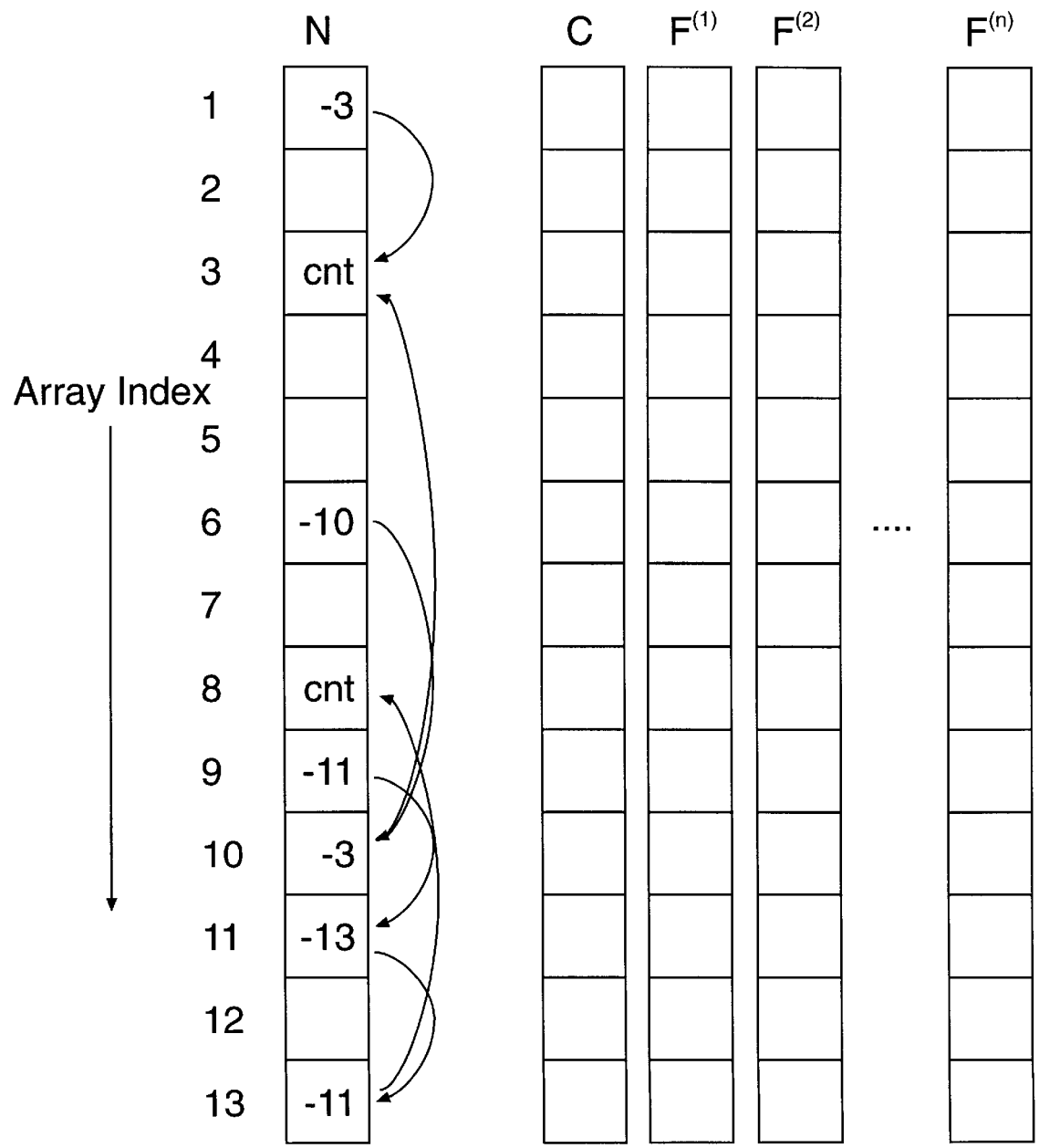

FIGS. 11A, 11B, and 11C represent data structures that may be employed in practicing the present invention;

FIGS. 12A and 12B illustrate data structures in the form of an N array and an $F^{(n)}$ array, respectively, as may be used in the present invention;

FIG. 13 illustrates an alternative data structure to FIG. 12 useful in practicing the present invention;

FIG. 14 illustrates another alternative data structure useful in practicing the present invention.

Figure 2:
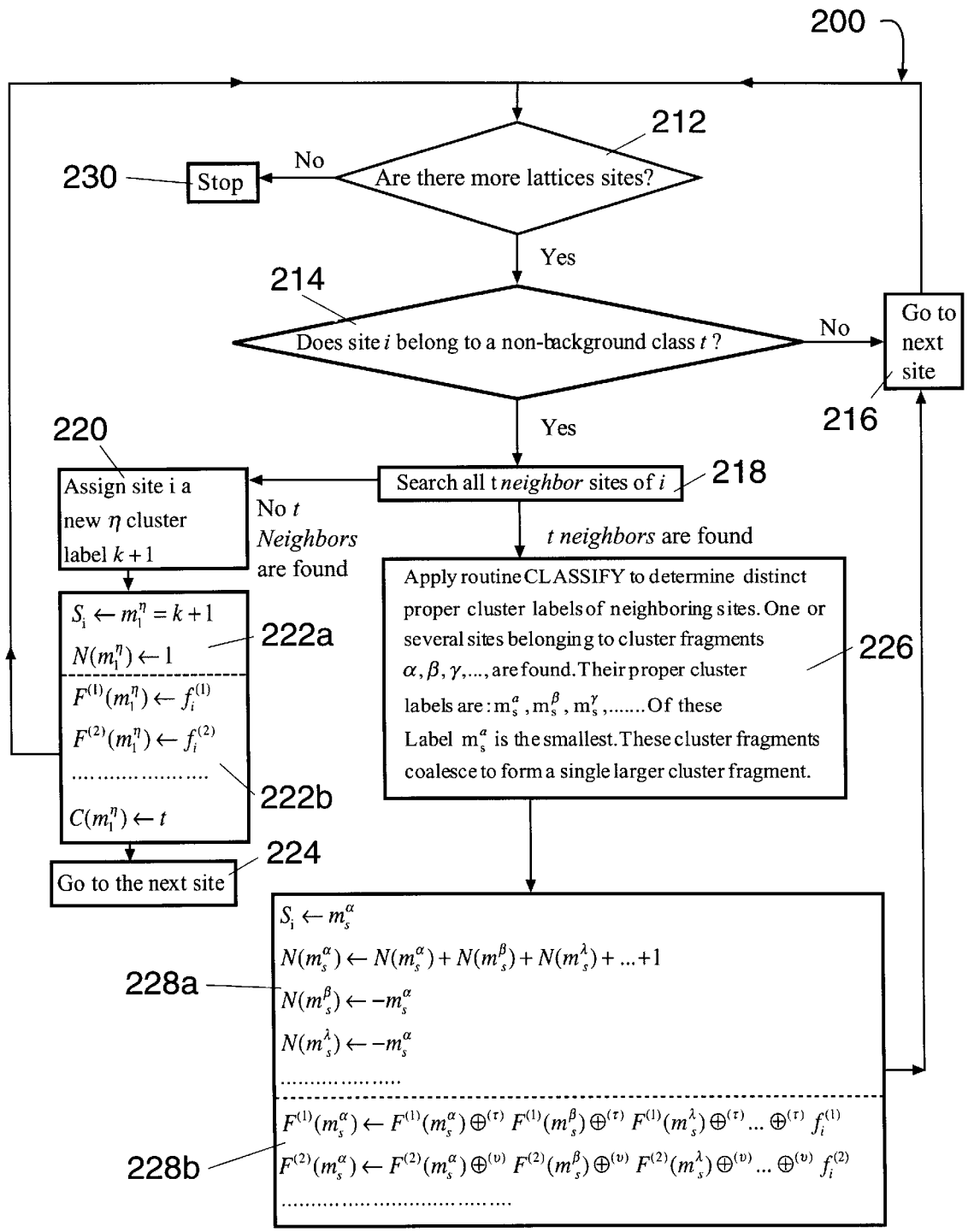
FIG. 2 shows a flow chart of an EHK algorithm.

Appendix 1 shows an EHK algorithm listing corresponding to data structure of FIG. 12; and Appendix 2 shows an EUHK algorithm listing;

Appendix 3 shows an EHK algorithm listing corresponding to data structure of FIG. 13; and Appendix 4 shows an EHK algorithm listing corresponding to the flow chart of FIG. 2 and the data structure of FIG. 14.

DETAILED DESCRIPTION OF THE PREFERRED EMBODIMENT

The present invention provides an analysis tool for the examination of physical observations or events. That is, data may be derived from any of the forces known in the universe, whether gravitational, electrical, magnetic, or nuclear. This obviously includes any combinations thereof such as the electromagnetic spectrum. Consequently, the present invention extends to image processing where an image is derived from the use of any portion of the electromagnetic spectrum, whether infrared, visible, ultraviolet, or beyond. The invention also applies to MRI (magnetic resonance imaging), ultrasound imaging, electromicroscopy, electron tunneling microscopy, and any other parameters that can be assigned space coordinates. This includes such parameters as temperature and pressure also. Physical observations may moreover be obtained by electron microscopy, or any other technique for the collection of data. After the physical data (or other types of data, such as observation of behavior, for example) are collected, the data may be processed into a graph or an array of any number of dimensions. The present invention is not restricted to the particular manner of obtaining data.

The Enhanced HK Feature

The enhanced HK feature (EHK) permits the calculation of new cluster parameters (beyond the population count) for multiple classes within the context of the HK algorithm. These enhancements fit naturally with the UHK features described below.

Turning attention to FIG. 2 and Appendix 4, Appendix 4 is a commented program listing setting forth an example of the EHK features, and FIG. 2 is a flow chart of the enhanced EHK algorithm. In the BBHK algorithm as described above, the information sought is concerned with the number of clusters within a bounded border lattice and the population count for each such cluster. Suppose now, instead, one desires to examine a different property.

Thus, let $f^{(n)}(i)$ be some nth property of the i'th site. For one example, the function value could be zero if all sites adjacent to site i are members of the same cluster. The expression $f^{(n)}(i)$ could be a scalar, a vector, or a general array. For example, $f^{(n)}(i)$ could denote that site i is on a cluster perimeter: when the site is on the perimeter, then $f^{(n)}(i)$ is set to 1, but otherwise it is set to 0 (to indicate a site not on the cluster boundary).

Another $f^{(n)}(i)$ could denote the x coordinate of the i'th site so that $f^{(n)}(i)=x_i$. As another example, $f^{(n)}(i)$ could also denote a non-scalar quantity such as a vector, e.g. $f^{(n)}(i)= (x_i^2, y_i^2, z_i^2)$.

Thus, FIG. 2 shows a subroutine or flow chart 200. Much of FIG. 2 corresponds to a similar flow chart in my 1976 article promulgating the HK algorithm, but at least portions $\Psi$ and $\Xi$ are new. The subroutine in FIG. 2 analyzes all clusters that belong to non-background classes. Background classes are classes that are not analyzed for cluster by the algorithm. At box 212, the algorithm, working in a programmed computer illustratively, determines whether any further lattice sites need to be examined. If such a further site exists, then the processor advances to box 214 in the program where a determination is made as to whether the next site i belongs to a non-background class t. If not, the processor proceeds to the next lattice site, indicated at 216.

However, if site i is in fact found to contain a class t characteristic, then the processor advances to box 218. At 218, the processor examines the sites neighboring of site i. If there is no neighbor found that also belongs to class t then site i must be part of a 2 new cluster. In this condition, the program advances to box 220 where site i is assigned a new cluster label. In FIG. 2, Greek letters denote cluster fragments. Hence, a first cluster fragment to be encountered may be named $\alpha$, the second one $\beta$, and so on. (For example, in FIG. 1(a), the processing of array 100A located 7 different cluster fragments, but these seven fragments were determined to comprise just two clusters. These cluster fragments merge into just two clusters.) Let k represent the number of cluster fragments that have been numbered separately. Hence, until a first cluster fragment is found, k=0. When a first cluster fragment is found, k is incremented, and is incremented each time another cluster fragment is found.

This is conveniently denoted by the expression k←k+1, which means store the value of the expression to the right of the arrow in the memory location pointed to by the variable to the left of the arrow. This use of the (left-pointing) arrow ← is used herein in the figures and appendices.

The program next advances to box 222 which is divided into two sections, 222a and 222b separated by a broken line. In portion 222a, the operations described with reference to the BBHK algorithm are executed. In particular, the site i is assigned to the new cluster label and the population counter for that cluster label is initialized. In portion 222a, the expression $S_i$ means site i, and S is an array that stores all the lattice sites in sequential position in computer memory. The variable i denotes the position of $S_i$ relative to the first array element in memory. Variables i and k are integer identifiers stored in memory. As mentioned, k is a count that increments whenever a new cluster fragment is encountered so that a new label can be created.

The first line in box portion 222a is $S_i \leftarrow m_1^{\eta}=k+1$. This means that the new cluster identifier will be the letter $\eta$, that the element at site i is labeled as $m_1^{72}$ and that there is now one further label. The second line in box portion 222a is $N(m_1^{\eta}) \leftarrow 1$, which means that the population counter for the new cluster fragment is set to a count of 1 (and it is thereby initialized). The variable N is an array that is maintained in computer memory. If an element of array N is positive, it denotes the number of sites in the cluster fragment and its index denotes the cluster's proper label if negative, it points to a proper label directly or indirectly (via an intermediary). (FIG. 14 represents an N array in computer memory, where some elements of the array are positive and others are negative. FIG. 14 will be discussed infra.)

Turning now to box portion 222b, which concerns the EHK feature, the cluster analysis processor or computer performs further operations. The expression F, as N, is another cumulative value. These steps again are initialization of the variables shown in portion 222b, namely $F^{(1)}$, $F^{(2)}$ and so on. Variable $F^{(1)}$ is a general quantity which could denote a summation over all x values of the sites in the cluster fragment, which is the first moment for x. Variable $F^{(2)}$ is another general quantity which could be, for example, the first moment for the cluster sites in the y direction. The F and N values are array elements that are stored sequentially in computer memory. (FIG. 14 shows an $F^{(n)}$ array.) In the operations shown in FIG. 2, the first general quantity $F^{(1)}$ for $m_1^n$ is set to $f_i^{(1)}$. The second general quantity $F^{(2)}$ for $m_1^n$ is set to $f_i^{(2)}$. Following the initialization of the $F^{(n)}$ quantities, the variable C in portion 222b is also initialized. C identifies the class of the cluster fragment. (FIG. 14 shows a C array.) In the operation shown in FIG. 2 the quantity C for $m_i^n$ is set to the class t of site i. When these operations are finished, the program proceeds to box 224, which routes back to the top of FIG. 2.

Concerning box 218 again, in the event that a search of the neighboring sites determines that a neighbor has indeed been found, the program instead of advancing to box 220 will advance to box 226. The routine CLASSIFY is applied. The CLASSIFY routine is given in my Oct. 15, 1976 article cited supra, which is incorporated by reference. A version of CLASSIFY is given in Appendix 4.

The processor locates cluster fragments and labels them in memory. As noted, $\alpha$, $\beta$, $\gamma$ etc. each are cluster fragment identifiers. They are dynamic entities that change during processing until complete clusters are identified. Thus, the processor may identify several array elements as part of cluster $\alpha$. Each cluster could be multiply labeled by the HK algorithm so that each cluster $\alpha$ is represented by a set of $\alpha$ labels:

$$\{m_1^\alpha, m_2^\alpha, m_3^\alpha, \ldots, m_s^\alpha, \ldots, {}_2^\alpha\}$$

In this notation, the superscript indicates labels of a given cluster (or cluster fragment if the cluster is not complete. It is seen here that all elements of this set are for cluster a). Hence, using this notation on FIG. 1(b), for example, the first entire cluster would comprise the set of labels $\{1, 2, 3, 4\}$. So, $m_1^\alpha=1$, $m_2^\alpha=2$, $m_3^\alpha=3$, and $m_4^\alpha=4$. In such case, $m_s^\alpha=m_1^\alpha$ because $m_1^\alpha$ is the smallest in the set. The processor chooses $m_s^\alpha$, the smallest value in the set, to be the "proper label" for the cluster. Accordingly, the value of $N(m_s^\alpha)$ is positive. The other $N(m_p^\alpha)$ in the set (where p=1, 2, . . . , 4 and p≠s) are negative and point directly or indirectly to the proper label $N(m_s^\alpha)$. The choice of the proper label as the smallest value in the set is not mandatory for the HK algorithm. Any other value in the set would do just as well.

The processor now proceeds to box 228 having a portion 228a and 228b. Portion 228a corresponds to the contents of a similarly-located box in the flow chart appearing a FIG. 1 of my 1976 article. In portion 228a, site i is given its label classification, the population counter $N(m_s^\alpha)$ is updated to equal the sum of the population counters for the cluster fragments plus 1. The "1" stands for the addition of site i into the population count $N(m_s^\alpha)$ for cluster $\alpha$. The other $N(m_4^\alpha)$ are negative and no longer serve the role of population counters. They point to the proper label $m_s^\alpha$ of the merged cluster.

The processing represented by 228b is new. Portion 228b (corresponding to the symbol Ξ) represents further operations that are both associative and commutative. The illustrative values $f^{(1)}(m_s^\alpha)$ and $F^{(2)}(m_s^\alpha)$ are updated, and the resulting new cumulative value is stored. The processor then advances to box 216, from which it will return to box 212 to determine whether there are anymore lattice sites. Once all the lattice sites have been examined, the processing stops, as indicated at 230.

With further regard to operations that may be performed in processing portion 228b, in using the EHK algorithm, the symbol $\oplus^{(n)}$ denotes a general binary EHK operation. It could be either a scalar or non-scalar operation. The only requirement on the operation is that it must be associative and commutative. Addition, scalar multiplication, set union, and set intersection are examples of such operations. Also, functions such as max(a,b) and min(a,b) can also define such operators. In two dimensions, these functions enable the calculation of a bounding box for a cluster, by defining $\oplus^{(n)}$ as $x_i \oplus^{(n)} x_j \equiv \max(x_i, x_j)$. Accordingly, when merging two partial clusters, this operation picks the max x value of the two operands.

Cluster moments, which characterize the shape of the clusters, are very important properties for image analysis. They can easily be determined using the EHK algorithm. Such moments can be defined in Equation (1):

$$X_j^n(k) = \sum_{i \in k} x_j^{(n)}(i) \tag{1}$$

Here, the left side of Equation (1) denotes the n'th moment of the k'th cluster for the j'th coordinate, where j=1, 2, . . . d, and where d is the space dimension. On the right side of Equation (1), the variable $x_j^n(i)$ is the j'th coordinate raised to power n for the i'th site belonging to the k'th cluster. These moments can be calculated using the EHK algorithm. Referring to Appendix 1, the $f^{(n)}(i)$ quantities in equations <1> to <3> and <7> to <9> would be identified with the $x_j^n(i)$ coordinates. The quantity $F^{(n)}(k(t),t)$ (where t is the cluster class) in equations <1> to <9> would be identified with the partial moments $X_j^{(n)}(k)$.

Following Pratt, Digital Image Processing, 2nd Ed. (Wiley, & Sons 1991), one can define a general cluster moment $M_k(m(1), m(2), \ldots, m(j), \ldots, m(d))$ for all coordinates in d dimensions as follows:

$$M_k(m(1), m(2), \ldots, m(j), \ldots, m(d)) = \tag{2}$$
$$\sum_{i \in k} C_i(m(1), m(2), \ldots, m(j), \ldots, m(d))$$

where $$C_i(m(1), m(2), \ldots, m(j), \ldots, m(d)) = \prod_{r=1}^{d} x_r^{m(r)}(i) \tag{3}$$

In Equation (3), the symbol Π denotes a product of the coordinates x, over d dimensions, and m(r) is the power that $x_r$ is raised to for the r'th dimension. The summation is carried over all sites i of the cluster k. Equation (1) is a special case of Equation (2), where $$X_j^{(n)}(k) = M_k(m(1)=0, m(2)=0, \ldots, m(j)=n, \ldots, m(d)=0) \tag{4}$$

In Equation (4) only the exponent m(j) is non-zero, so that the product in Equation (3) degenerates into a single factor $x_j^n(i)$.

Now, the processor can calculate the following $f^n(,i)$ properties and equate them with $C_i(m(1), m(2), \ldots, m(j), \ldots, m(d))$. It can also equate the partial moment $M_k(m(1), m(2), \ldots, m(j), \ldots, m(d))$ with the quantity $F^{(n)}(k(t),t)$ of Appendix 1. Equation (2) can be further generalized by equating the quantity $f^{(n)}(i)$ with a linear combination of $C_i(m(1), m(2), \ldots, m(j), \ldots, m(d))$ quantities defined by Equation (3):

$$f^{(n)}(i) = \sum_p a_p C_i(m(1), m(2), \ldots, m(j), \ldots, m(d)) \qquad (5)$$

The summation in Equation (5) is over all values of $m(1)$, $m(2), \ldots, m(j), \ldots m(d)$ which are denoted symbolically by p. The quantities $a_p$ are constant values. A special case of Equation (5) is the sum of the first moments in two dimensions:

$$f^{(n)}(i) = x_1(i) + x_2(i) \qquad (6)$$

In Equation (6), $x_1(i)$ is the x position of site i and $x_2(i)$ is the y position of site i. The $F^{(n)}(k(t),t)$ quantities for the k'th cluster would now be given as a linear combination of the generalized moments given by Equation (2). Thus, see Equation (7):

$$F^{(n)}(k(t), t) = \sum_p a_p M_k(m(1), m(2), \ldots, m(j), \ldots m(d)) \qquad (7)$$

Some examples are now given of some cluster parameters that can be determined using the EHK feature. In image shape analysis, perimeters and moments are important features. A first example of a cluster parameter that can be calculated using EHK processing is the first moment of a cluster for one coordinate. In a second example, the same calculation is performed where label recycling is used. In a third example, a moment of inertia in two dimensions will be processed. It will be understood that cluster moments in higher dimensions can be processed.

EXAMPLE 1

Figures 1A, 1B, 1C:
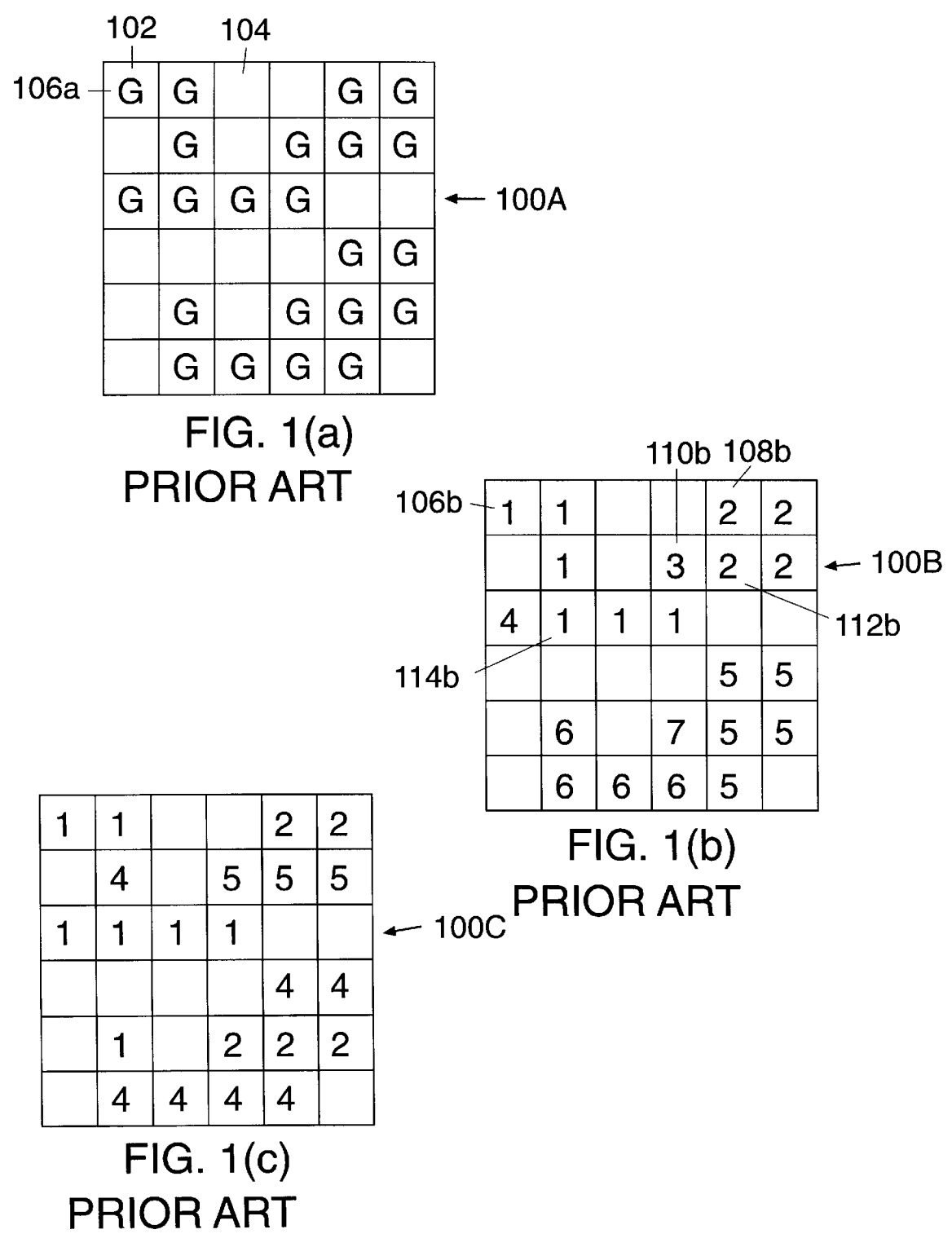

The EHK feature can be applied to the image data of prior art FIG. 1. It can be used, for example, to calculate the first moment of the x coordinate. First, to specify an illustrative coordinate system, let the positive direction of the x axis be to the right and let the positive direction of the y axis be downward. Hence, in FIG. 1(b), sites are described in the format corresponding to (row, column). That is, the top left corner is site (1,1) for row 1, column 1. The bottom left corner is (6,1). The top right corner is (1,6), and the bottom right corner is thus (6,6). Thus, the first moment of a cluster element at site (1,6) will be 6, because this column is 6 units away from the reference position (0,0) (not shown in the figure) in the x direction. Hence, $f^{(n)}(i) = x(i)$ for this example.

Using EHK processing, the first moment for each cluster may be determined and stored in a one dimensional array X. The size (population) of array X will be the same as that of array N, the labeling array.

Starting with FIG. 1(b), the top left corner is the site (1,1). The value of x(1,1) is 1, and the proper label site is 1. So the initial value for the sum of x moments for cluster number 1 is 1. This is expressed as X(1)=1.

For site (1,2), the first moment x(1,2)=2, and the proper label is 1. Since X(1) is to represent the total value of x moments of all elements of cluster number 1, the process must add 2, which is the x value of (1,2), to X(1). Hence, new X(1)=3.

Sites (1,3) and (1,4) were not marked "G" in FIG. 1(a) and thus are not labeled as belonging to any cluster. As such, they do not contribute to any component of array X. The next lattice site containing a cluster fragment is site (1,5), which is labeled for cluster 2. Since this cluster has not yet been encountered in determining the first moments, the processor now initializes X(2)=x(1,5)=5.

Continuing in this fashion, site (1,6) is labeled as part of cluster number 2, and the x moment of this site is 6. Hence, new X(2)=5+6=11.

In the next row, the first cluster fragment is located at site (2,2), which is labeled for cluster 1. Its first moment is 2. Adding this to the prior X(1) value of 3, new X(1)=5.

Next, site (2,4) is labeled for cluster 3. Hence, the value for X(3) will now be set to 4.

Site (2,5) has a proper label of 2. Cluster fragment label 3 points to label 2. Hence, the new value for X(2) will be the prior X(2) plus X(3) plus x(2,5). That is, new X(2)=11+4+5=20. Next, site (2,6) is part of cluster number 2. Its first moment x is 6, so X(2)=26 at the end of the second row.

In the third row, a fragment of a new cluster 4 is encountered at site (4,1). Hence, X(4)=1. At site (3,2), which has an x moment of 2, fragments of cluster numbers 1 and 4 are merged. As a consequence, new X(1)=5+1+2=8. At site (3,3), another proper label 1 is found, so the x moment of 3 for this site is added to the ongoing accumulation, and new X(1)=8+3=11.

Site (3,4) (see 110b) merges two clusters which until this site had proper labels of 1 and 2. Label 1 is chosen as the new cluster label because it has the lower value and in the convention adopted, the lower cluster number is chosen. Thus, cluster label 1 is chosen as the new proper label. The new accumulation for X(1) will be the prior value of X(1) (which was 11) plus the prior value of X(2) (which was 26) plus the x moment 4 for site (3,4). That is, there is an update so that new X(1)=11+26+4=41. No further cluster fragments are encountered in the third row.

In the fourth row, the first cluster fragment is at site (4,5) and is assigned cluster label 5. As the x moment of this site is 5, now X(5)=5. At site (4,6), another fragment of cluster number 5 is found. The x moment of 6 for this site is added to the prior accumulation, so X(5)=5+6=11.

The first cluster fragment found in the fifth row is located at site (5,2). It is assigned cluster number 6, a new cluster number. Hence, X(6)=x(5,2)=2. Another fragment of another cluster number 7 is found at site (5,4). Thus, X(7)=x(5,4)=4. At site (5,5), a cluster merger occurs for cluster numbers 5 and 7. The surviving proper cluster label is cluster number 5 for the merged clusters. Hence, adding the prior X(7) and X(5) and the current x(5,5) yields new X(5)=11+4+5=20. At site (5,6), another fragment of cluster number 5 is found, and X(5) is updated to X(5)=20+6=26.

In the bottom row, the first cluster fragment found there is at site (6,2) and is part of cluster number 6. Hence, new X(6)=old X(6)+x(6,2)=2+2=4. At site (6,3), another fragment of cluster number 6 is found. Its first moment x=3 so new X(6)=4+3=7. At site (6,4), another fragment is found. It is nearest to cluster numbers 6 and 7. However, cluster number 7 was merged with cluster number 5. Hence, at site (6,4), a merger occurs, with the surviving cluster number of 5. Consequently, new X(5)=old X(5)+X(6)+x(6,4)=26+7+4=37. At site (6,5), another fragment of cluster number 5 is found, so X(5) is updated to include x(6,5). Thus, new X(5)=37+5=42.

No further cluster fragments are encountered in the lattice 100B of FIG. 1(b). Therefore, proper labels 1 and 5 survive as the only proper labels. The cluster moments are X(1)=41 and X(5)=42.

EXAMPLE 2

EHK processing may be applied to FIG. 1(c) also. FIG. 1(c) uses BBHK with label recycling, whereas FIG. 1(b) uses BBHK without label recycling.

At the end of row 1, X(1)=1+2=3 and X(2)=5+6=11. At the end of row 2, X(4)=X(1)+x(2,2)=3+2=5. Also, X(5)=X(2)+x(2,4)+x(2,5)+x(2,6)=11+4+5+6=26. At the end of row 3, label 1 is the only surviving proper label, and X(1)=41. This completes the first cluster because it does not extend to row 4.

At the end of row 4, X(4)=11. At the end of row 5, X(1)=2 and X(2)=X(4)+x(5,4)+x(5,5)+x(5,6)=11+4+5+6=26. At the end of row 6, X(4)=X(1)+X(2) + the x moments of the four cluster fragments of cluster number 4 in the bottom row. Thus, X(4)=2+26+2+3+4+5=42.

When label recycling is employed, the process preferably outputs results for completed clusters for a completed row because the label will be recycled. If results for completed clusters at completed rows, that information would be lost unless other steps are taken to preserve it.

EXAMPLE 3

Another example of a cluster parameter that can be calculated using EHK processing is the moment of inertia of a cluster in two dimensions. It will be understood that more dimensions can be used.

Consider a lattice of point masses at each lattice site. The mass of each site is taken to be unity. The moment of inertia $I_s^{(2)}$ of a cluster s in two dimensions around an axis perpendicular to the X-Y plane and going through the center of the mass of the cluster is given by Equation (8):

$$I_s^{(2)} = \sum_i (x_i^2 + y_i^2) - (1/s)\left[\left(\sum_i x_i\right)^2 + \left(\sum_i y_i\right)^2\right] \quad (8)$$

In Equation (8), the summation is taken over all sites s of the cluster. One may seek to define an equivalent cluster ellipse which would have the same mass s and the same moment of inertia $I_s^{(2)}$ as the cluster in question. The moment of inertia for an ellipse around an axis perpendicular to its plane and going through the intersection of the ellipse principal axes is given by the following Equation (9):

$$I_s^{(2)} = \left(\frac{s}{4}\right)(a^2 + b^2) \quad (9)$$

where s, a, and b are the mass, the principal axis and the minor axis of the ellipse, respectively. For a square lattice, assume that the distance between nearest neighbors is 1 so that each site is associated with a unit area. Therefore, the area of the effective ellipse is also s. Hence, the area of the equivalent ellipse is given by Equation (10):

$$s = ab\pi \quad (10)$$

In Equations (9) and (10), a and b are unknown quantities. The values for s and $I_s^{(2)}$ $$a = 1/2\left[\sqrt{\frac{4I_s^{(2)}}{s} + \frac{2s}{\pi}} + \sqrt{\frac{4I_s^{(2)}}{s} - \frac{2s}{\pi}}\right] \quad (11)$$

-continued $$b = 1/2\left[\sqrt{\frac{4I_s^{(2)}}{s} + \frac{2s}{\pi}} - \sqrt{\frac{4I_s^{(2)}}{s} - \frac{2s}{\pi}}\right] \quad (12)$$

can be calculated using the EHK algorithm for the summations in Equation (8). Solving for a and b yields Equations (11) and (12).

The eccentricity e of the cluster is given by Equation (13).

$$e = \frac{\sqrt{a^2 - b^2}}{a} \quad (13)$$

The quantities of interest are a, b and e can be calculated by programming Equations (11), (12) and (13) into the computer. They can be calculated as part of the EHK processing when the EHK completes processing a cluster. They provide the image processing system with information on the shape of the cluster. The values of e lie between 0 and 1. If e=0, then the cluster is likely to be more circular. As e increases the cluster is likely to be more elongated. The a and b values provide information on the linear dimensions of the cluster.

The Unbounded HK Feature

For the UHK feature, when dealing with a d-dimensional lattice problem, the lattice has finite bounds in (d-1) dimensions. In the remaining dimension, under the UHK feature, lattice size is not bounded. For example in 2-D, the extension provided by the UHK feature enables the scanning of a continuous (unbounded) tape of a given (bounded) width for surface clusters. With the UHK, there would be no limits on the length dimension of the tape; only its width is required to be bounded.

The same principle applies to 3-D objects. A 3-D object, such as an unbounded cylindrical pipe, could be continuously scanned along its height dimension under the UHK feature. As the cylinder is scanned, cluster numbers and other cluster parameters can be evaluated and analyzed in real time. In the 3-D version of the unbounded algorithm, there is no restriction on the shape of the 2-D cuts scanned. The only restriction is that they would be bounded in 2-D. The UHK feature is independent of the specific version of the HK algorithm used. It includes also multi-processor versions of the HK algorithm.

One example of a 3-D application that could benefit from cluster analysis is x-ray tomography of cracks in rocket fuel. The cracks could be looked at as clusters. Again, the cluster analysis could be done in real time, continuously, using the EUHK algorithm. Another 3-D application would be neutron scattering for explosives detection where the voxel classes would be defined by chemical elements and the scattered γ-ray intensity.

EXAMPLE 4

Figure 3:
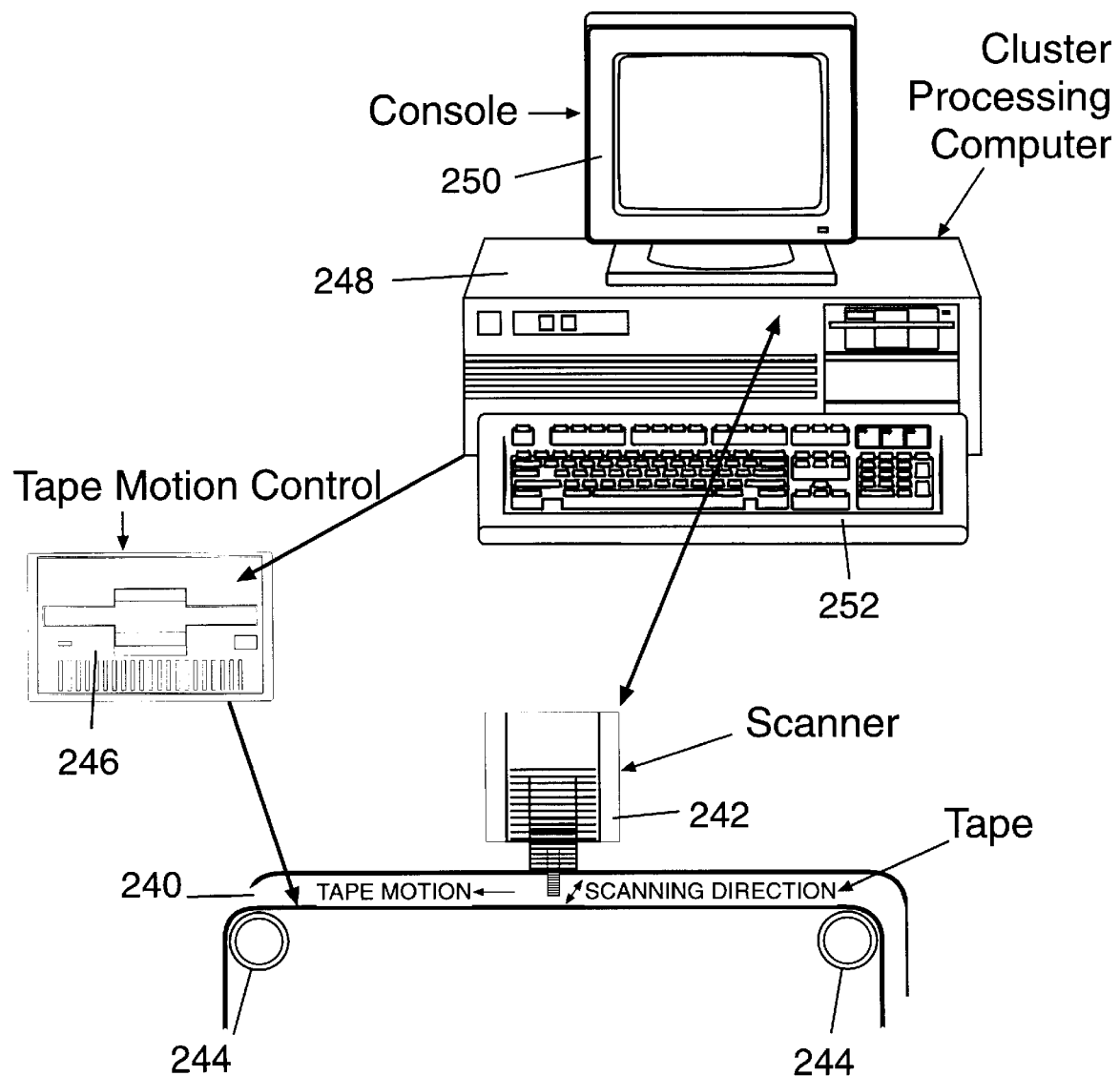
FIG. 3 shows an inspection system for an unbounded workpiece that is being analyzed according to the present invention.

FIG. 3 illustrates a system that applies the EUHK algorithm for analyzing in real time the surface cluster structure of a continuous tape 240 scanned by a surface scanning device 242 such as a microscope or interferometer. Scanning device 242 scans tape 240 along the direction of the width of the tape. The tape 240 is moved from right to left by a tape drive 244 under control of a tape motion controller 246. The scanned data is digitized and provided in digital form to a computer 248. For example, the digitized data may represent surface height relative to some reference level. Also, further digital data may comprise a position measure that would enable the cluster processing computer 248 to determine the x, y position of a pixel on the tape relative to the beginning of the tape. Using the height information, computer 248 would assign a class value to this position. For example, the surface roughness height range could be subdivided to sub-ranges where each sub-range would be defined as different class and assigned a unique numerical value. Other examples of surface entities could be surface imprints. These imprints could be made from different materials which could be determined by x-ray scattering.

Once computer 248 assigns class values to a line of pixels, that scanned line information is read by the "merge-cluster2" program shown in Appendix 2. These scanned lines are read one by one by the computer and analyzed for clusters. The computer 248 controls the scanning device 242 rate of scanning and tape motion. If the "merge-cluster2" program detects abnormal surface clusters, it alerts the operator by displaying the cluster position and other parameters on a computer console 250. The computer could also take an automatic action, such as shutting down the scanner and the tape motion controller 246. The program could also be stopped from a keyboard 252 through the invocation of a stop-program procedure.

For the arrangement of FIG. 3 to work, computer 248 must process the lines faster than the rate at which scanning device 242 scans the tape 240. If it does not, the solutions to this problem are:

1. reduce the scanning rate of the scanning device 242; or
2. increase the speed of computer 248; or
3. use a multi-processor computer system.

The HK algorithm can be parallelized by partitioning the lattice into sections of lines, where each processor can work on its sections independently of each other. These sections are stitched together through the HK multi-labeling process.

In the Appendix 2 example of the EUHK, clusters are analyzed after they are completed. However, the processor does not have to wait until a cluster is completed before it is analyzed. Since clusters are analyzed at the end of each row, it is also possible to analyze cluster fragments with this method. The program can be easily modified for looking at cluster fragments after the completion of every row. The same cluster analysis could be done for the cluster fragments as the one done for the complete cluster. If the cluster fragments shows abnormality, the alert procedure could be called.

FIG. 3 depicts an application where microscopic features of a surface are analyzed for clusters. The same approach could be used for air or space surveillance. For example, a satellite could be continuously scanning stripes of land. This is essentially the same approach as applied to the scanning device 242 of FIG. 3. In this case, the scanning device (the satellite) is the moving object and the scanned object (the Earth) is considered to be the stationary object. Also, in the FIG. 3 scanner example, pixel sizes are measured in microns or nanometers. For space surveillance, the "pixels" would be measured in meters. Yet, the same cluster analysis principles would apply to both.

Appendix 2 demonstrates the application of the EUHK to a 2-D problem. However, the same principles would apply to 3-D problems. Instead of scanning and analyzing the subject matter line by line, in 3-D, one analyzes the subject (object) plane by plane or in groups of planes. Also, one would be clustering voxels instead of pixels. In a simple cubic lattice, there would be six nearest neighbors instead of four for the square lattice. So the program would have to check for two nearest neighbors in the same plane and for a nearest neighbor in the previous plane.

The analysis described here does not apply only to square or cubic lattices. It could be used for any lattice structure in all dimensions and not just for the nearest neighbors.

Non-Lattice Extension for the EUHK Algorithm

The previous section discusses the use of the EUHK algorithm for two and three dimensional lattices. Such processing could be further extended to more general graphs such as given in FIG. 4. One can apply the EUHK for the graph represented in this figure. This graph consists of linearly connected supernodes 1, ... i −1, i, i +1. ... Each supernode consists of regular nodes labeled as i, k where i is the supernode index and k is the k'th regular node in the i'th supernode. In this graph, edges exist between regular nodes only if they belong to the same supernode or to two adjacent supernodes. A supernode edge, shown as a heavy line, exists between two supernodes if there exists at least one edge between two regular nodes belonging to the two supernodes.

Figure 5:
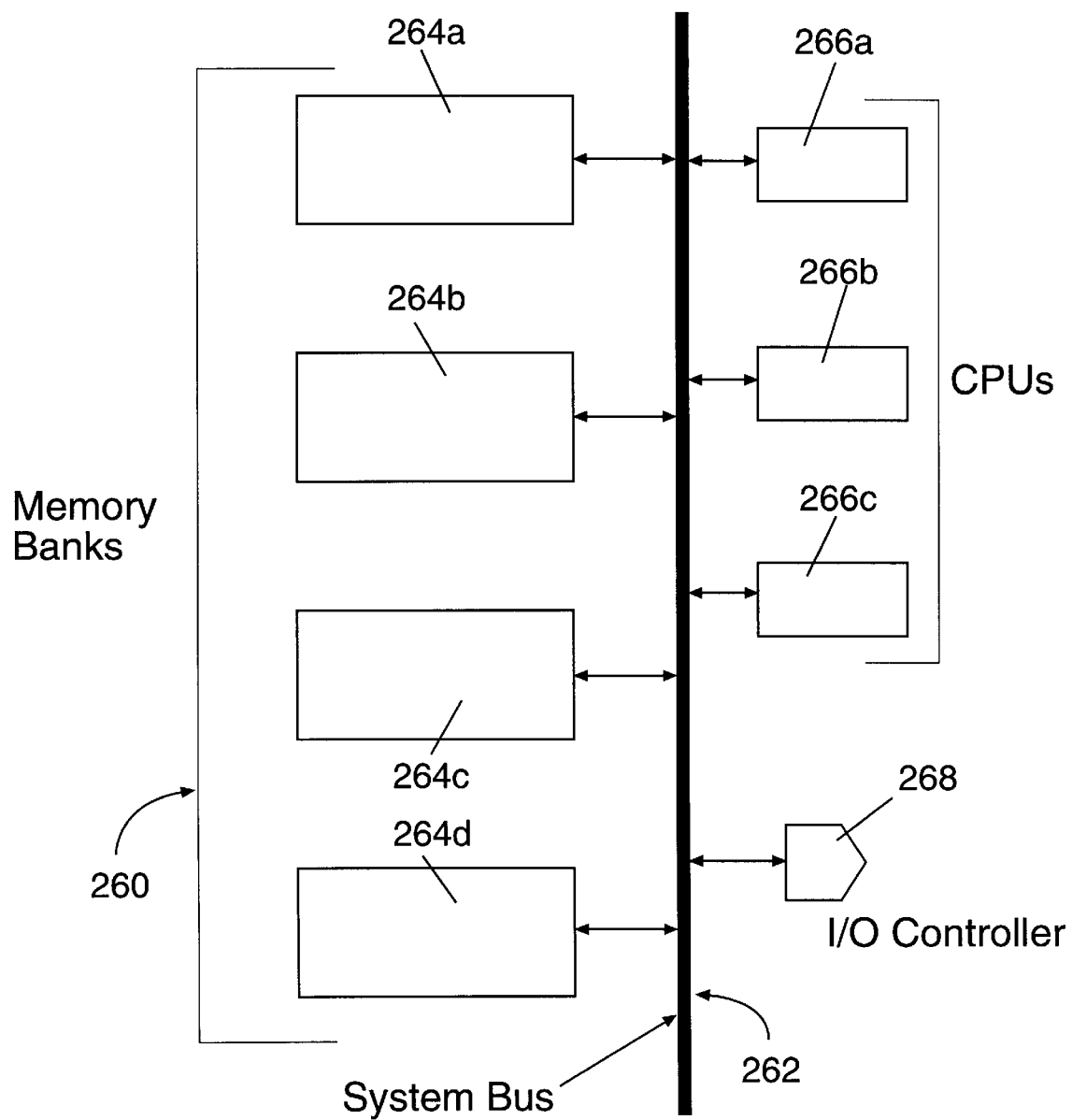
FIG. 5 shows an architecture suitable for use in an embodiment of the present invention.

By partitioning a graph into a linear form of supernodes as represented by FIG. 5, one can apply the EUHK algorithm. As in the lattice case, one needs only to store adjacent sets of supernodes in computer memory. Also, one could reuse labels, just as explained above for the 2-D and 3-D lattices. For example, one set of labels would apply for the odd supernodes and another set for the even supernodes. The number of label sets depends only on the number of supernodes that are kept in memory. One may advantageously assign one set of labels per supernode or to a subset of sequential supernodes.

Cluster Analysis Computer

It will be understood from the prior description that FIG. 3 describes an image processing system. This invention deals with an improvement in the computer component (cluster processing computer) 248. FIG. 5 presents an example of a block diagram of a computer 260 that can be used for cluster analysis. Computer 260 includes a system bus 262 that connects memory banks 264a, b, c, d, CPUs (central processing units) 266a, b, c and I/O devices via an ,I/O controller 268. The CPUs 266 execute programs that are stored in memory. Each CPU consists of an ALU (arithmetic logic unit) that executes machine instructions, PCU (program control unit) that controls program execution, and a collection of registers, which are used in data computation. One of the registers is a program counter that points to memory code instruction in memory that is to be next executed. Some CPUs contain cache memory to speed computation. Memory stores both data and machine code. The memory may comprise DRAM, SRAM, ROMs, or other random access non-volatile storage. Each memory bank 264 consists of a vector of memory words. Because of the nature of a memory bank, accessing any word takes a fixed amount of time. The CPUs on the bus can access any memory bank through a CPU register that points to the specific memory. The computer 260 communicates with the outside world through various I/O device controllers 268, examples of which are console, disk, serial lines, sensory devices, etc.

Figure 6:
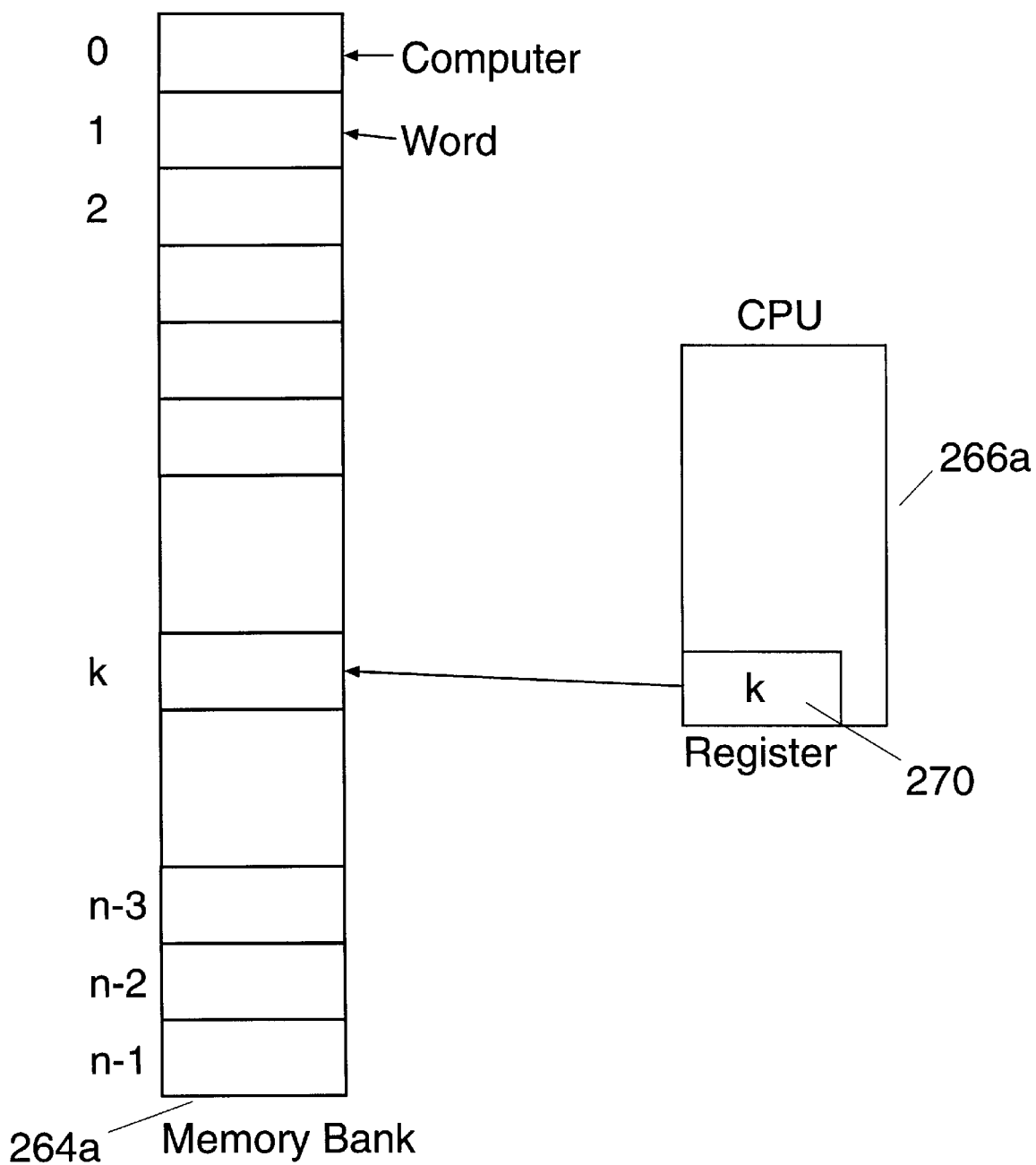
FIG. 6 illustrates how a register points to a location in memory, in an application of the present invention.

FIG. 6 shows a memory bank 264a. The memory elements may be randomly accessible devices such as DRAMs or SRAMs, or may comprise other forms of memory, whether volatile or non-volatile, and may be solid-state or magnetic. The nature of the memory device is chosen by the circuit designer, but ordinarily would be DRAM. The organization (as opposed to the accessibility) of the memory is sequential and linear for each bank and can be represented by a vector. Accessing the k'th word is usually done by a CPU register 270 that contains the value k as the memory index.

The cluster processing computer 260 receives image data through an I/O controller 260. In FIG. 3, the input comes from a real time scanner. However, the input can come also from a mass storage medium such as a disk or a magnetic tape. Alternatively and/or additionally, the computer can also generate the input data through simulation. The input data would usually come in one of two forms, in a raster form or a vector form.

In a raster form, the data would be represented by an array. Each array element would correspond to a lattice site. In two dimensions, this would correspond to an array of pixels, and in three dimensions that would be an array of voxels. Data represented as a 2-dimensional or 3-dimensional array is stored in computer memory as a one dimensional array because computer memory 264a shown in FIG. 6 is organized as a one dimensional array.

Further data structures represented by FIGS. 10 through 14 are suitable. In general, for storing a 2-dimensional array, assuming that the image consists of R×C pixels, the first R row elements would be stored first, followed by a second R row elements, and so on. In some computer languages, for two-dimensional arrays, the columns are stored one after the other. (In the preferred embodiment, only few rows have to be stored at any point in time).

The data that is stored for pixels (voxels) is its information content. This data could be either a scalar or a vector. The pixel information content could be gray level, color, electromagnetic frequency ranges and intensities, pressure and temperature vectors, and so on. The values of the vector components could be discrete or continuous.

Figure 7:
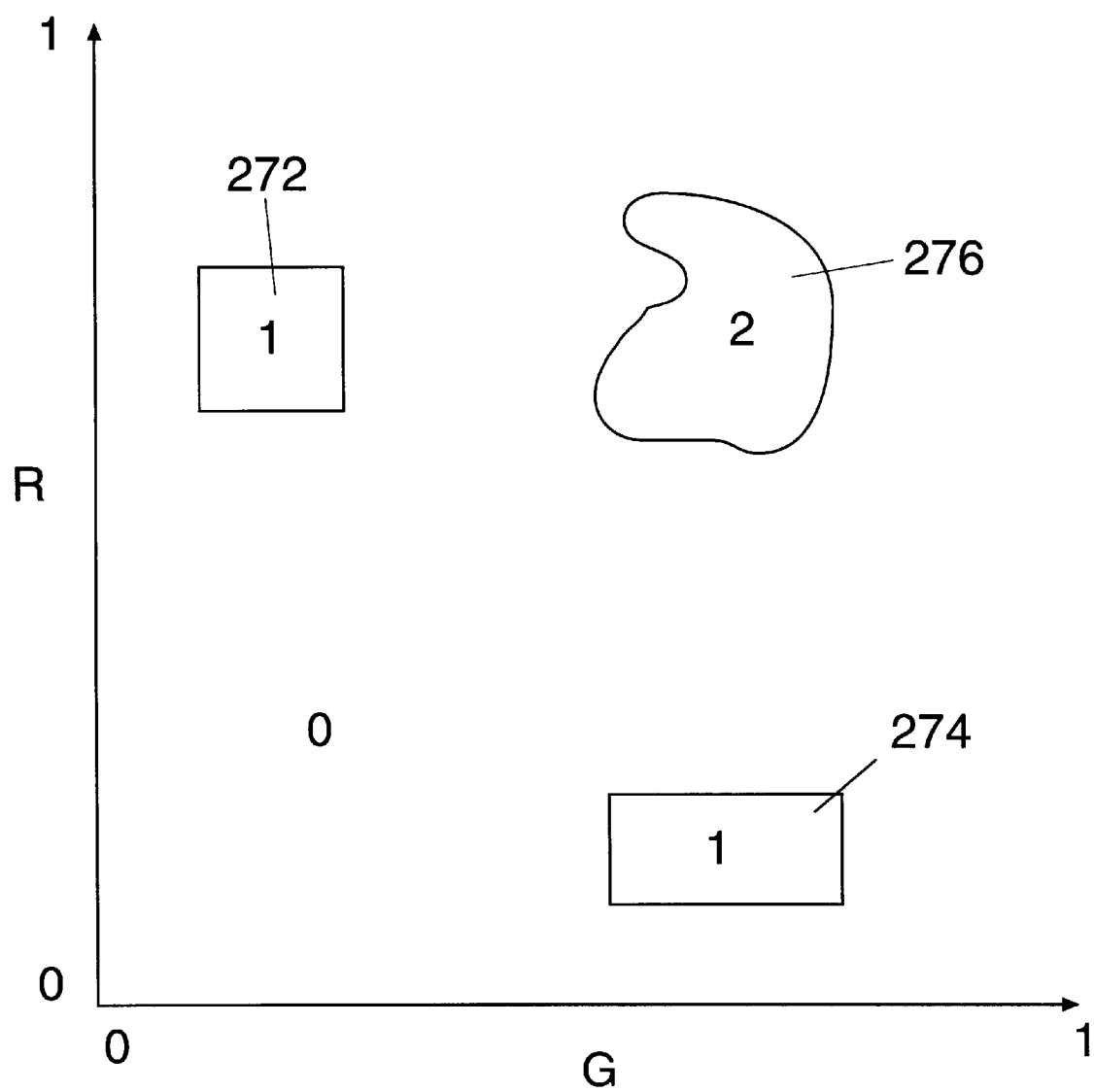
FIG. 7 is used to illustrate how a color image can be classified into two classes "1" and "2" based on red and green components of the image color.

To illustrate this point, consider color. Color can be defined by a vector of three components—Red, Green and Blue (RGB), for example. These components each assume values from 0 to 1. FIG. 7 illustrates this point and shows a two component color R and G represented in a Cartesian system. Each point in the universe of colors defined by an imaginary square (0,0), (1,0), (1,1) and (0,1) represents an RG combination. For cluster analysis, one must classify this color space. For example, RG points that fall inside one of the two rectangular shapes 272, 274 belong to class 1. Those that are inside the irregular shape labeled by 2 belong to class 2. On the other hand, those data points that are not in 1 nor 2 belong to the background class 0. Only pixels belonging to class 1 or 2 are analyzed for clusters.

The pixel values do not have to denote colors. For example, they could denote temperature and pressure (TP). However, the same principle of classifying would apply. Instead of classifying color values, the computer or processor would classify TP values. Just as the colors can be represented by a three dimensional space, the TP classifications form a two dimensional space. These spaces need not be two or three dimensional spaces, but can be of any dimension. Such spaces are known as feature spaces. The paper by S. Haimov et al. in *IEEE Trans. on Geoscience and Remote Sensing*, Vol. 27, pp 606–610 (1989) describes four dimensional space. Indeed, that paper describes the use of the BBHK algorithm for cluster analysis in a four dimensional feature space. Accordingly, the EHK feature can also be applied to high dimensional feature spaces.

The value of pixels/voxels could be discrete. For example, in direct neutron imaging, fast neutrons are scattered by nuclei. In addition to that, the nuclei emit gamma radiation that is specific to the type of nuclide. Such emissions, identify the chemical elements within a voxel. Thus the class of voxel is determined by the chemical element therein. (To simplify, assume that each voxel contains only one element type.) The coordinates of the voxel are determined by detecting the gamma ray radiation from different angles. So now the processor has the position of the voxel and its information content (element).

To sum up, for raster presentation, a two or three dimensional array is created in memory. Physically, the array is one dimensional because of the internal structure of computer memory. The values contained in the array would be class identifiers that represent the class type of the pixel or voxel, and any suitable technique for classification of pixels or voxels will work with the present invention—which is concerned with analyzing clusters whose pixels/voxels are (or have been) characterized by specific class identifiers. Defining pixel/voxel classes depends on the specific application that would use UEHK processing.

It may be noted that position data for pixels or voxels is not required to be explicitly stored in memory. Since the dimensions of the pixel/voxel arrays are known, the position of the pixel can be inferred from the pixel/voxel array indices.

Cluster analysis is concerned with neighboring pixels/voxels having the same (or similar) classification. So if a pixel class is stored in memory location P and the pixel is not on any of the four boundaries of the image, and assuming the memory is linear rather than two or more dimensional, then its nearest neighbors memory locations would be at P−1, P+1, P−R and P+R, where R is the number of pixels in a row. Similar observations could be made for the six nearest neighbors in three-dimensions. The specific implementation of this invention is not confined to using linear style memory. Two dimensional memory arrays that store image data can be used in a graphical representation. Such memory arrays may be configured by a series of interconnected shift registers. These have been used in the field of character recognition and are usable in the present invention also.

In addition to a raster representation, the processor(s) using this invention will work with a vector representation of images. In vector representation, not only is the class of a data point denoted, but also the (x,y) or (x,y,z) coordinates of the point in two or three dimensions, respectively are stored in computer memory. Spherical or cylindrical coordinates may also be used, or any other (preferably orthogonal) coordinate system. So in two dimensions, three quantities are needed—the coordinates and the class identifier. In three dimensions, four quantities are needed—the three coordinates and the class identifier. When using vector representation, for example, two sites are considered to be neighbors if the distance between them is less than some predefined distance r. Other definitions of neighbors could also be used to define clusters.

Figure 4:
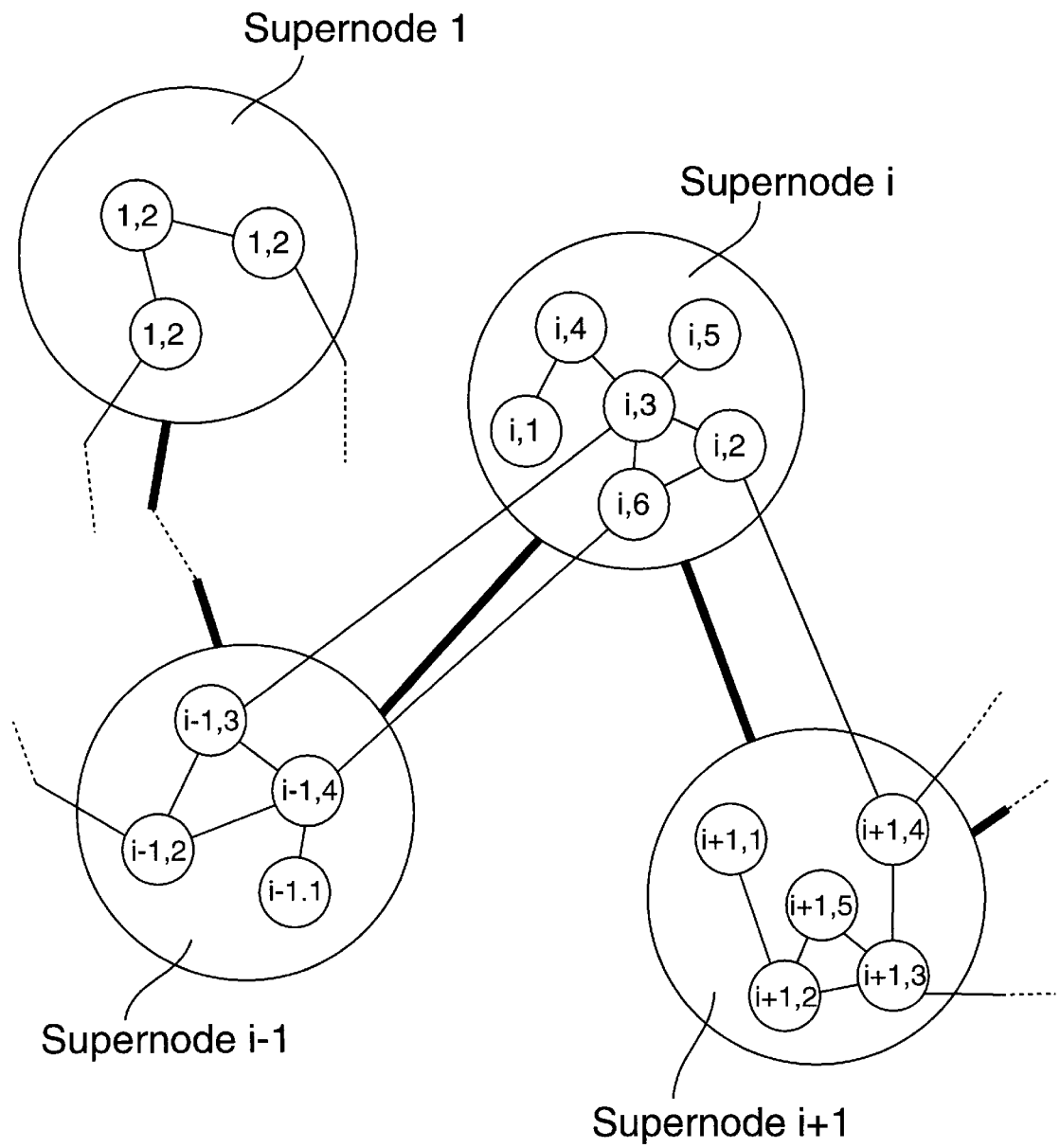
FIG. 4 shows a generalized graph having supernodes to be analyzed using the present invention.
Figure 8:
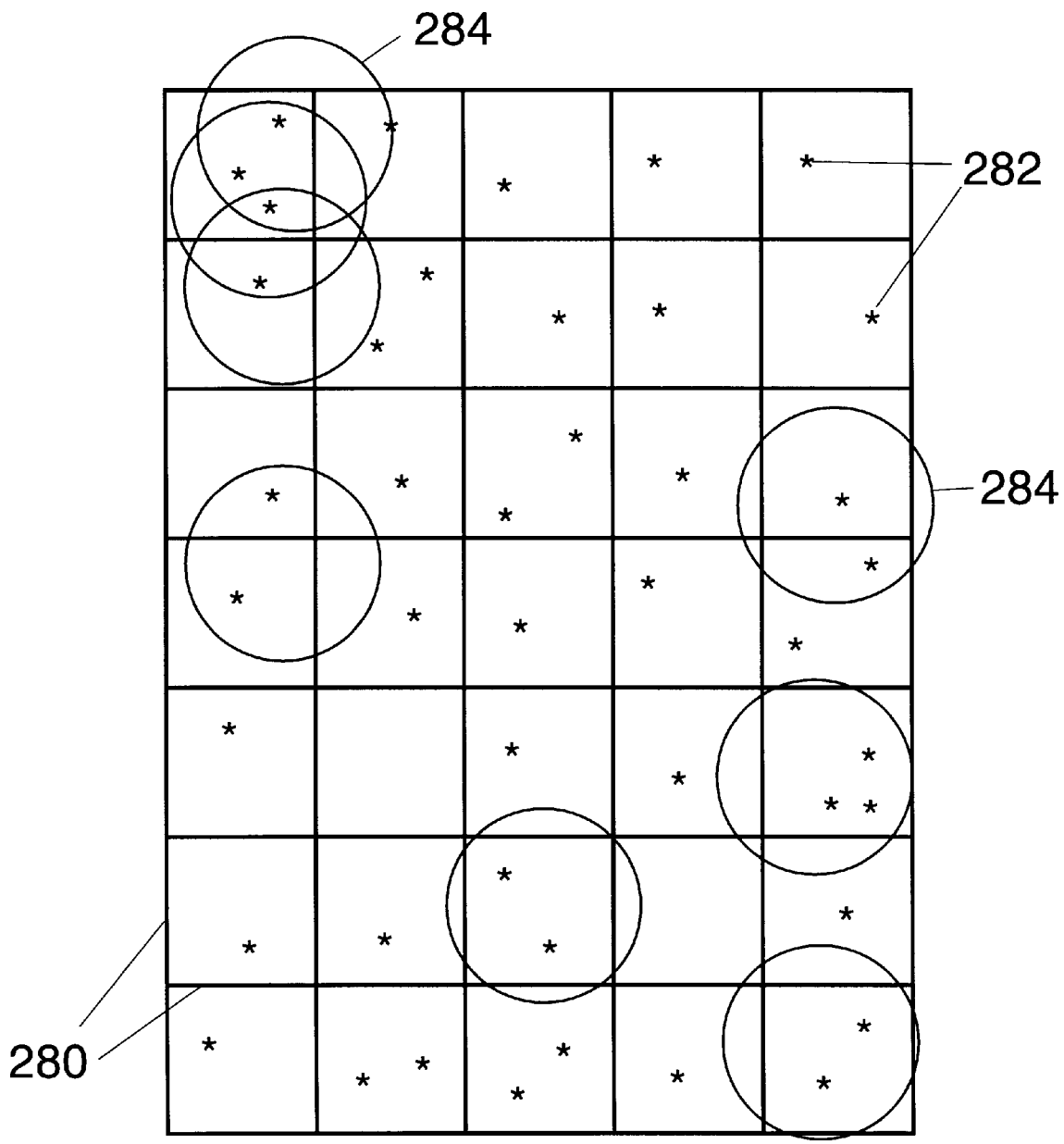
FIG. 8 illustrates a set of vector data points, on which a reticulated grid has been overlain, which may be used in the present invention.

FIG. 8 demonstrates vector representation images. They do not have a lattice structure inherent from the scanning method. However, a grid 280 is overlain on the image to reduce computational time for determining neighbors. The grid contains arbitrary cells. Sites represented by the asterisk symbol (*) 282 are scattered throughout the image and the cells of the grid. Hence, the vector data can be grouped into cells. For each cell, the processor can allocate a memory word that points to memory segments that contain the coordinates and the class identifier for the (x,y) site. FIG. 8 shows how clusters can be identified through drawing circles 284 of radius r around some of the sites 282. If a site 282 falls within a circle 284 centered around another site 282, then the two sites are deemed to be in the same cluster. For each site in a cell, the computer need only look in the same cell and eight neighboring cells for cluster members. The cell mechanism allows the processor to limit the scope of the search for cluster members. Also it enables the processor to use the EUHK algorithm because the system will store two rows of cells at the same time. In three dimensions, the system would need to store two planes of cells. FIG. 8 is a special case of FIG. 4. In FIG. 4, each supernode corresponds to a row of cells in 2-dimensions (or a plane in 3-dimensions) in FIG. 8.

Turning now to the actual processing of the image, a preferred embodiment uses machine instructions stored in memory to analyze the (classified) image data stored in memory. These machine instructions could be stored in dynamic memory but preferably are stored in a non-volatile memory such as some form of ROM. In the early days of computers, programmers would write machine instruction code to manipulate data. Unfortunately, complicated machine code is very difficult to understand. Instead, it is more convenient to represent these machine instructions with pseudo-computer code, as shown in Appendices 1 to 4. This pseudo-code can be easily translated to computer language code such as C++ by a person ordinarily skilled in computer programming. The C++ code can be compiled into machine code that can be stored in computer memory shown in FIG. 5 and 6. Such machine code will cause the processor to process the image data and generate an output that contains the cluster analysis of the input data. Alternatively, a language interpreter that does not create machine code could be used instead of a compiler. However, interpreted code is usually significantly slower than compiled code. The pseudo-code and the present description have used generalized HK operators $\oplus$, and scalar and non-scalar quantities. Object oriented computer languages, such as C++, allow defining general quantities and operators. Thus, the use of such quantities is in line with modern computer concepts.

Real Time Analysis of Unbounded Lattices and Parallel Processing

Figure 9:
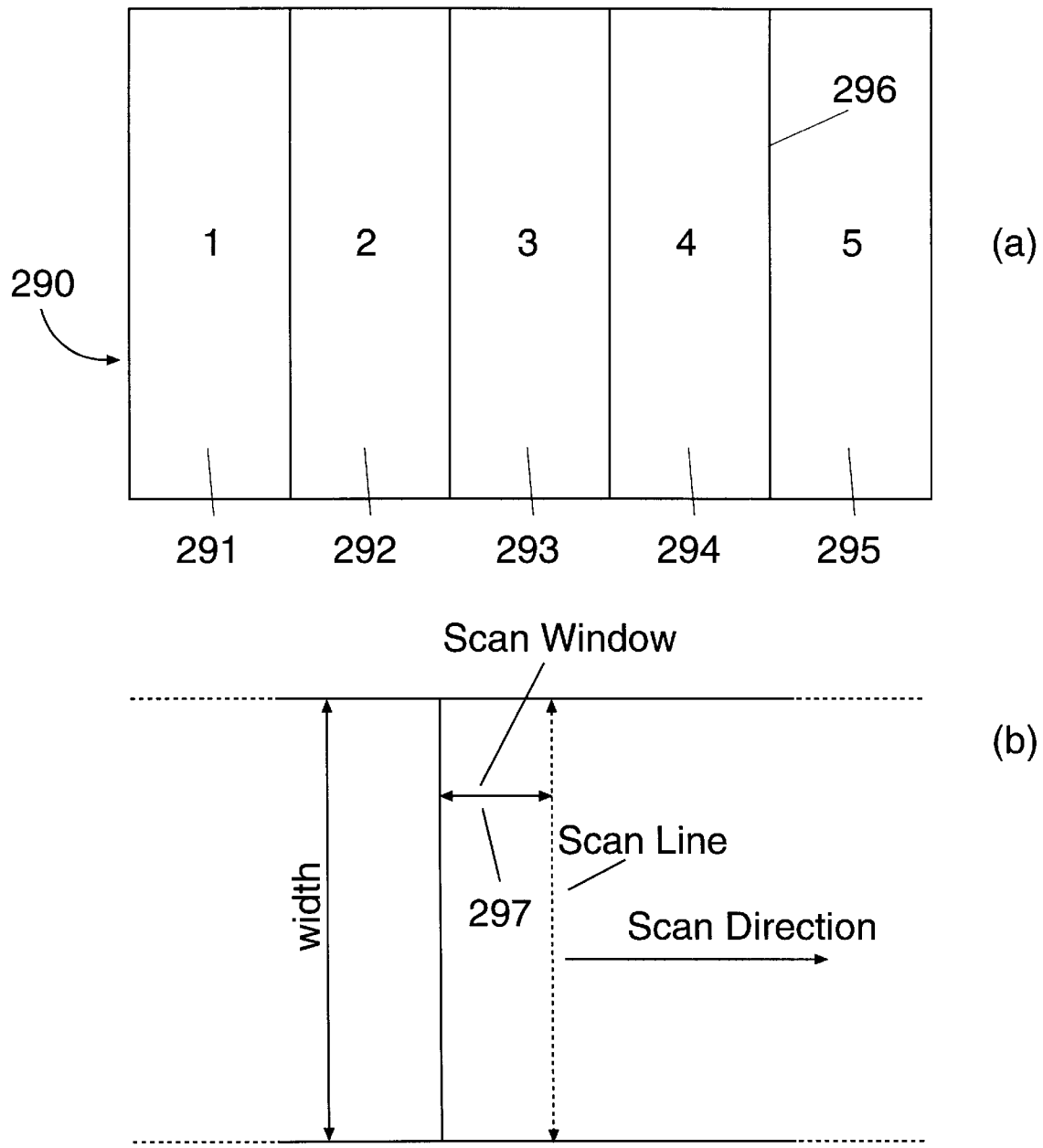
FIG. 9 illustrates how a workpiece that is unbounded in one dimension may be analyzed according to a feature of the present invention.

In real time analysis of clusters in two dimensions, one of the lattice dimensions (e.g. the width) is bounded, whereas the second dimension (e.g. the length) is unbounded. In this application, as shown in FIG. 9(*b*), assume that the lattice is scanned widthwise, line by line. The scanned information is stored in a FIFO (First In First Out) scan window memory. Only small number of lines will be stored in scan window memory. As lines are stored in memory, they are analyzed in real time by the processor(s). This configuration uses a label recycling procedure similar to that used in the original HK algorithm. For a single processor operation, one would have to store two rows and two sets of labels. Cluster parameters would be calculated every time a row is completed.

Figure 10:
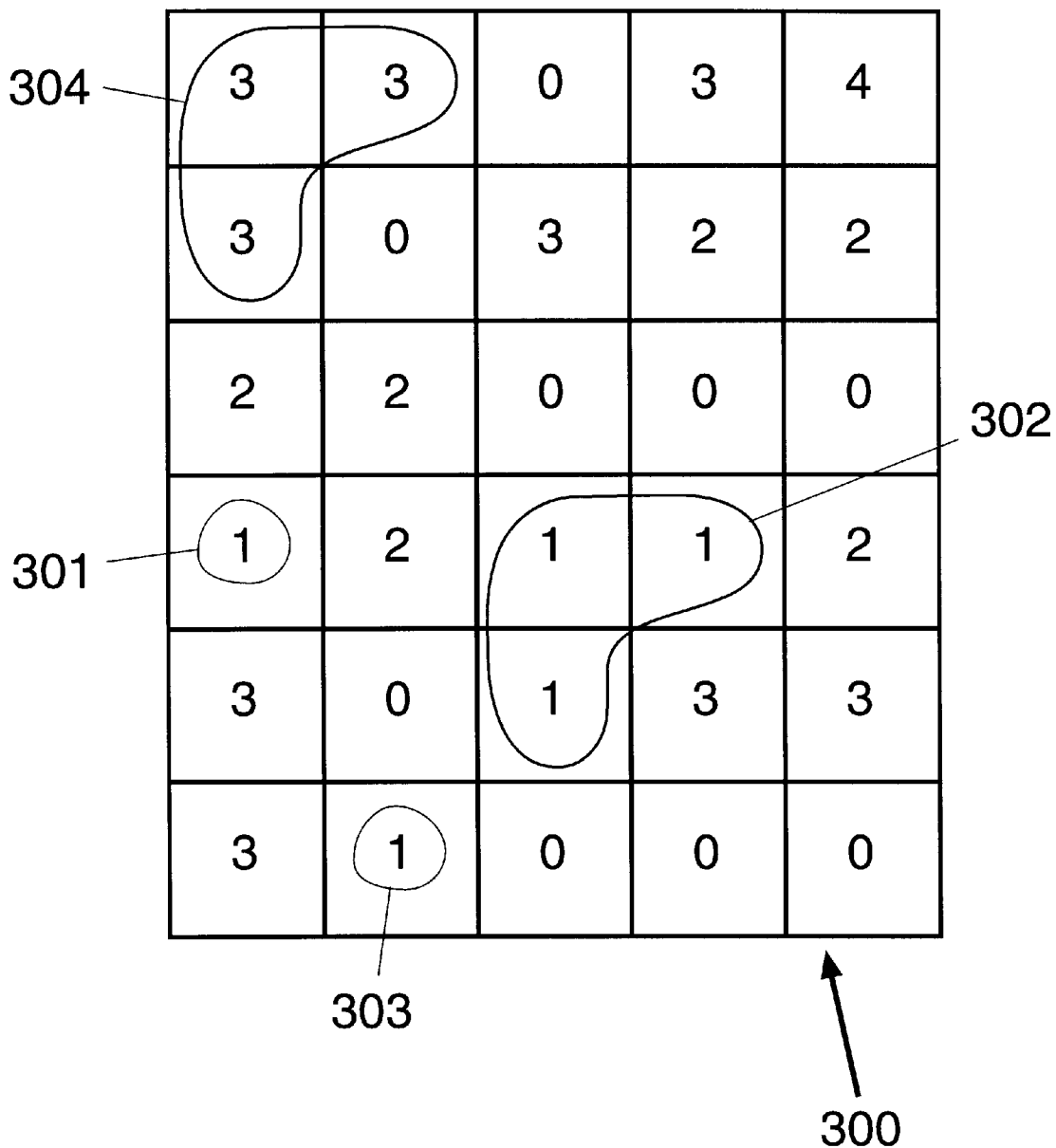
FIG. 10 illustrates a five by six array that contains multiple classes, all of which may be analyzed by the present invention simultaneously.

Parallel real time cluster analysis is more challenging than parallel fixed size lattice analysis. If the size of the lattice is known, it can be partitioned into sections. FIG. 10(*a*) partitions a fixed size image 290 into five sections, 291, 292, 293, 294, 295. Each section is assigned to a respective processor and memory. Each processor would analyze its corresponding one lattice section. Only at section boundaries such as 296 would special action be needed for clusters extending from one section to the next. At that point, the HK labeling technique is preferably used to stitch the sections together and complete the cluster analysis.

For the type of arrangement shown in FIG. 9(*b*), a fixed lattice is partitioned into S sections. For purposes of illustration, let the lattice described here contain two classes where one class is a background class that is not analyzed. This calls for kR(3S−1) bytes for storing the lattice, k⌈R/2⌉(3S−1) for the labels, and r⌈R/2⌉(3S−1) bytes per $F^{(n)}$ quantity for a single class analysis. The expression "⌈x⌉" rounds a number x up to the next higher integer value. R, k and r are the row size, the number of bytes per label, and a unit of $F^{(n)}$ quantity, respectively. The factor of 3 that appears in these formulas corresponds to the need to store for each section—except for the first section—its first row, associated labels and $F^{(n)}$ quantities to enable linking each section with its previous section.

Thus, for fixed size lattices, the entire lattice can be accessed and subdivided. On the other hand, for real time operation, it is preferred to access only a small window 297 of the scanned area, as shown in FIG. 9(*b*). Only a small amount of memory, representing the scan window, would be needed for analysis. As the scan window memory used for the analysis becomes larger, the real time information becomes less timely. One question is how to partition the space for parallel operation. In one embodiment, each processor would handle a single row. A better approach is to partition the individual rows in the scan window into S consecutive processor sections. Again, the multi-labeling technique will allow linking together these sections, once all the row sections are completed.

Data structures

In using the present invention, it is preferred that raster or lattice type images will usually be stored in arrays. For example, FIG. 10 presents an array 300 that displays the classes of sites for a 5×6 lattice. Five classes are identified for this lattice: classes 0, 1, 2, 3, 4. These class numbers are shown in FIG. 10. Class 0 is considered to be background and it is not analyzed for clusters. The other four classes are analyzed for clusters.

In FIG. 10, for class 1 for example, there are three clusters if only the nearest neighbors are considered for the cluster definition. The three class 1 clusters are as follows: a first cluster 301 at site (4,1); a second cluster 302 includes sites (4,3), (4,4), and (5,3); and a third cluster 303 includes just one site (6,2). Likewise, there are three class 2 clusters, a fist one at sites (2,5) and (2,6); a second at (3,1), (3,2), and (4,2); and a third one at (4,5). FIG. 10 contains five class 3 clusters as follows: a first one 304 at (1,1), (1,2), and (2,1); second at 1,4; a third one at (2,3); a fourth one at (5,1), (6,1); and a fifth one at (5,4), (5,5)}. For class 4 there is only one cluster at (1,5). Thus, FIG. 10 is like FIG. 1(*a*). While FIG. 10 has five classes of date, FIG. 1(*a*) has just two types (classes) of data—either background or gray. That is, FIG. 1(*a*) presents a 6×6 lattice represented by a 6×6 array. It consists of two classes, gray and white where the white class is considered to be background.

Another lattice array is the site label array that stores labels for the sites. FIGS. 1(*b*) and 1(*c*) are such arrays.

FIGS. 11*a*, *b* and *c* concern a vector presentation of an image and, in this example, the 5×7 image of FIG. 8. The image is represented by two 5×7 arrays marked as FIG. 11(*a*) and FIG. 11(*c*). FIG. 11(*c*) gives the count of number of asterisk (*) symbols in each cell shown in FIG. 8.

The coordinates and the classes of each site are given in FIG. 11(*b*) by a two-dimensional array 310. There are three columns of this array: the first column denotes the x-coordinate of the site; the second column denotes the y-coordinate of the site; and the third column denotes the class type of the site. In the example of FIG. 8, there is only one class, which is the asterisk. Therefore, if a site contains a cluster fragment, its third column element (marked "class" in FIG. 11(*b*)) will be set to "1". Since there are 44 sites in the FIG. 8 image, there will be 44 rows in array 310.

FIG. 11(*a*) is a two-dimensional pointer array 312. Each element of array 312 points to a row, if the cell is not empty, in array 310 that contains the first site of the cell. The other sites of the cell follow contiguously the first cell site. For example, element (1,1) of array 312 points to the first row of array 310. The other two sites in that top left cell (1,1) are represented by rows 2 and 3 of array 310. Element (1,2) in array 312, which represents one site, points to row 4 of array 310.

The ability to partition the image into cells allows one to apply the UHK to vector represented images. Similar arrays can be defined in three dimensions.

FIG. 12A displays an example of a 4×6 2-dimensional array 320 for N, the labeling array. FIG. 12(*b*) displays a corresponding $F^{(n)}$ quantities array 322. Array 320 allows for six labels and four classes. Each array element is either positive or negative. For example, data for class 1 is in a leftmost column 324 of FIG. 12(*a*). In column 324, only two elements (326 and 328 are positive, corresponding to lines 1 and 5. Hence, there are two clusters with proper labels 1 (i.e., the column 1, first row site is positive) and 5 (the first column, fifth row site is positive). Those two clusters with proper labels have populations of 5 and 3, respectively. The other row indices are negative and therefore are not proper labels. They point directly or indirectly to the proper label.

The next column of array 320 is column 330. Because it is the second column, in this data structure, this concerns class 2 data sites. As shown in array 320, class 2 has proper labels 332, 334 at row 1 and row 2. As can be seen, the indices for the third and fourth rows in the second column are negative, and therefore do not indicate proper labels. These two entries point directly or indirectly to a proper label. For example, in column 324, the data 336 at (2,1) points to (1,1). The data 338 at (3,1) also points to (1,1). The data 340 at (4,1) points to (3,1) which points to (1,1). Class 2 has 2 proper labels 1 and 2 for row 1 and row 2. As can be observed from column 330, not all labels are used. For class 3 (the third column) there is only one proper label, and for class 4 (fourth column) there is only one proper label.

The $F^{(n)}$ array 322 shown in FIG. 12B has valid values only where marked by the symbol V. In array 322, only array elements that have corresponding proper label elements in array 320 of FIG. 12A have valid $F^{(n)}$ values. Those that correspond to non-proper labels have only partial $F^{(n)}$ values and should be ignored for most applications.

FIG. 13 represents an alternate and preferred data structure for the N and $F^{(n)}$ arrays. This data structure is more economical in terms of memory use than those given in FIG. 12A and 12B. FIG. 13 displays two data types, an array 350 of pointers P and cluster information structures R. In this example, the array 350 of pointers is stored in memory addresses 2000 to 2012 shown on the left of the P array 350. In this embodiment, the memory addresses 2000–2012 are used as the label set for the lattice instead of the integers 1,2,3 . . . , that are generated by box 220 of FIG. 2. Each array element of 350 is a pointer, which is a memory reference to another location in memory. For example, as represented by an arrow 352, location 2000, which is the first element in array, P(1), points to location 2002 in memory, which is the third element of the P array, P(3). Array element 2002 points to memory location 6000 which holds a data structure R at that location. There may be numerous R structures. In FIG. 13, however, only two such structures 354 and 356 are shown, corresponding to memory addresses 6000 and 6400. Each structure R holds, in contiguous memory locations, the class t of the cluster, the cluster population number N (N is now always positive integer denoting the cluster population) and the several F(n) quantities. To retrieve the class type t of the cluster with proper label 2002, the construct P(3)→t is used. The right arrow symbol → denotes that the array element P(3) points to a t component of some R structure. Similarly, the population count for the same cluster would be given by P(3)→N, where N denotes the population count. This approach could be applied for languages like "C" that support pointer arithmetic.

FIG. 13 represents data structures for just two clusters. The proper label for the first cluster is 2002. Labels (memory addresses) 2000 and 2009 point directly to the proper label 2002, whereas label 2005 points indirectly through label 2009 to label 2002. So the cluster labels for this cluster are {2002, 2000, 2005, 2009} where the first label in this set, 2002, is the proper label. The other cluster is represented by the label set {2007, 2008, 2010, 2012} where 2007 is the proper label. Proper label 2007 points to memory location 6400 which holds the cluster information structure R (356) that holds the cluster information for the cluster with proper label 2007.

If the two clusters with the proper labels 2002 and 2007, corresponding to P(3) and P(8), respectively, become merged into proper label 2007, then the combined population count for 2007 would be (P(8)→N)←(P(8)→N)+(P(3)→N)+1. This operation is similar to the array operation for the population count merge in 228*a* of FIG. 2. The same technique would apply to EHK cluster parameters $F^{(n)}$ such as cluster moments. If $F^{(1)}$ denotes the first moment for the x coordinate, then the first x-moment for the merged cluster would be (P(8)→$F^{(1)}$)←(P(8)→$F^{(1)}$)+(P(3)→$F^{(1)}$)+x(i), where i denotes the site where the cluster merger occurred. Appendix 3 presents a variation on the program of Appendix 1. It shows how a program can be written using the data structures of FIG. 13.

While the pointer approach is the most efficient one, many computer languages do not support pointers or structures. So the approach presented in FIG. 13 can be modified to include one-dimensional arrays only, as shown in FIG. 14. In FIG. 14, N is the traditional labeling and population count array. Its index, shown on the left of the array, denotes the cluster labels. In this example, 13 labels are permitted, but of course more can be used. C is an array that holds the class type for the cluster label in question. $F^{(1)}$, $F^{(2)}$, . . . , $F^{(n)}$ are cluster properties. The negative N array elements values in FIG. 14 are pointers to other labels, whereas the positive ones, denoted by "cnt," give the population count for the cluster. Appendix 4 presents a variation on the program of Appendix 1. It shows how a program can be written using the data structures of FIG. 14. The same data structure variations, which are based on FIG. 13 and FIG. 14, that have been applied to Appendix 1, can also be applied to Appendix 2 for the EUHK algorithm.

The following table provides a summary for the basic HK, BBHK, and its extensions.

|  | BBHK | EHK | UHK | EUHK |
|---|---|---|---|---|
| analysis | cluster numbers only | general cluster parameters | cluster number only | general cluster parameters |
| Classes** | 1 | M | M | M |
| type of graph | general graphs including | general graphs including | lattices including special | lattices including special |

-continued

|  | BBHK | EHK | UHK | EUHK |
|---|---|---|---|---|
| size of graph | lattices bounded | lattices bounded | graphs* unbounded | graphs* unbounded |

*special graphs denote graphs that can be described in terms of linear supernodes defined in the section titled Non-Lattice Extension for the EUHK Algorithm, and FIG. 4.

**These numbers do not include the background class. The numbers 1 and M denote the number of classes that can be analyzed in a single pass through the lattice (for BBHK, M classes would require M passes).

The present invention is not confined to the specific examples presented here. It is expected that numerous applications and modifications will be made without departing from the spirit of the present invention.

---

Appendix 1

*Merge_cluster*[1]
```
// General Comments
// the // notation defines a comment
// the ← arrow defines an assignment. a ← b + 1 means add 1 to data stored in
//memory location b and store it memory location identified by a. Only the content
//of memory location a is modified by this assignment
//
//The following is pseudo code for the cluster analysis program using data structeres
//of Fig. 12. A general representaion of the data is provided by a graph G.
// In graph G, every node i is assigned a class T(i) array
//element.T is a one dimensional array. Its size is equal to the number of nodes in
// the graph. We assume here that the T array has been read into memory
// from some I/O device. An example of a class is a grey level. If two grey levels
// are considered, say black and white then the number of classes is two
// comments marked by EHK denote new cluster shape EHK features beyond BBHK
// Included, but not specifically marked are also new EHK class features
//Intialization of variables
```
*For all classes t Do* //t is a variable stored in memory or in CPU register
    // t identifies a given class. Its values are t=1,2,...tmax. tmax is
    // is the number of classes of nodes
    $k(t) \leftarrow 0$    // k(t) is a label counter for class t. Its value is incremented when a
        // a new cluster fragment is found. At this point k(t) is initialized
        // to 0. k is an array of size tmax
*Endloop*
*For all nodes i in a G Do*
    $S(i) \leftarrow -1$    // mark all nodes in graph G as unvisited, S is a one dimensional array
        //of the size of the number of nodes in the graph. If it is marked −1 then
        // the node has not been processed yet by the program
*Endloop*
*For all nodes i in G Do*
    $t \leftarrow T(i)$ //get class of node i
    *If there are no edges from i to j, or an edge from i to j exists*
    *such that* $(S(j) = -1$ *or* $t \neq T(j))$ // not visited or different class
    *Then* //adjacent nodes are not labeled, so we start a new cluster fragment
        $k(t) \leftarrow k(t) + 1$ //increment label counter for class t
        $S(i) \leftarrow k(t)$    //label the first node of the cluster fragment
        $N(k(t),t) \leftarrow 1$ //count this node, N is a two dimensional labeling array whose
            //size is tmax x graph size
        //Do generalized HK operations. $F^{(n)}$ represents a generalized cummulative
        // quantity is could be a scalar or none scalar quantity. The dimensions of the
        // F arrays is the same as for the N array.
        // In this section of code we do EHK operations
        $F^{(1)}(k(t),t) \leftarrow f^{(1)}(i)$ //EHK    <1>
        $F^{(2)}(k(t),t) \leftarrow f^{(2)}(i)$ //EHK    <2>
        .....................
        $F^{(n)}(k(t),t) \leftarrow f^{(n)}(i)$ //EHK    <3>
        // the following are commented examples of generalized EHK operations
        // $F^{(1)}(k(t),t) \leftarrow x(i)$ // initialize value for the first moment of x (EHK)
        // $F^{(2)}(k(t),t) \leftarrow x(i)^2$ //initialize value for the second moment of x (EHK)
        .....................
        // $F^{(n)}(k(t),t) \leftarrow x(i)^n$ //initialize value for the n'th moment of x (EHK)
    *Else*
        *For all edges from node i to nodes j such that* $(t = T(j)$ *and* $S(j) \neq -1)$ *Do*
        // node *i* has adjacent nodes j of class t
        $s \leftarrow CLASSIFY1(j,t)$ // identifies the proper label of node j, s is a label of

Appendix 1

```
                            // node j
    If j is not first in the inner For loop
    then
        If q ≠ s then //merge cluster fragments. q is a storage variable for the
                      // previous cluster fragment label
            N(s,t) ← N(s,t) + N(q,t)
            // Generalized EHK operations
            F⁽¹⁾(s,t) ← F⁽¹⁾(s,t) ⊕⁽ʳ¹⁾ F⁽¹⁾(q,t)                //EHK    <4>
            F⁽²⁾(s,t) ← F⁽²⁾(s,t) ⊕⁽ʳ²⁾ F⁽²⁾(q,t)                //EHK    <5>
            ................
            F⁽ⁿ⁾(s,t) ← F⁽ⁿ⁾(s,t) ⊕⁽ʳⁿ⁾ F⁽ⁿ⁾(q,t)                //EHK    <6>
            N(q,t) ← –s //point to the proper cluster label s
            //The following are commented examples of Generalized EHK operations
            //these are regular scalar additions for the moments of x
            //F⁽¹⁾(s,t) ← F⁽¹⁾(s,t) + F⁽¹⁾(q,t)                  //EHK
            //F⁽²⁾(s,t) ← F⁽²⁾(s,t) + F⁽²⁾(q,t)                  //EHK
            ................
            //F⁽ⁿ⁾(s,t) ← F⁽ⁿ⁾(s,t) + F⁽ⁿ⁾(q,t)                  //EHK
        Endif // if q = s cluster fragments are already merged, no further action
                   // is needed
    Endif
    q ← s // set new node label to old
    Endloop
    N(s) ← N(s,t) + 1 // add the new node that merged the cluster fragments
                      //to the cluster count
    // Do generalized EHK operations for the node that merged the fragments
    //F⁽¹⁾(s,t) ← F⁽¹⁾(s,t) ⊕⁽ʳ¹⁾ f⁽¹⁾(i)  //EHK   <7>
    //F⁽²⁾(s,t) ← F⁽²⁾(s,t) ⊕⁽ʳ²⁾ f⁽²⁾(i)  //EHK   <8>
    ................
    //F⁽ⁿ⁾(s,t) ← F⁽ⁿ⁾(s,t) ⊕⁽ʳⁿ⁾ f⁽ⁿ⁾(i)  //EHK   <9>
    // commented generalized EHK operations for the node that merged the fragments
    //F⁽¹⁾(s,t) ← F⁽¹⁾(s,t) + x    //EHK
    //F⁽²⁾(s,t) ← F⁽²⁾(s,t) + x²   //EHK
    ................
    //F⁽ⁿ⁾(s,t) ← F⁽ⁿ⁾(s,t) + xⁿ  //EHK
    Endif
Endloop
End Merge_cluster¹
CLASSIFY1(i,t) //identifies the proper cluster label for a given cluster label i and
                // cluster class t. Returns proper cluster label
b ← S(i) //assign variable b site i label
c ← b //assign variable c the value of b
c ← –N(c,t) // get new value for c from the label array N
If c < 0 then
    return b //b is a proper label
b ← c
c ← –N(c,t)
if c< 0 then
    return b //b is a proper label
Loop until c<0//search for the proper label
    b ← c
    c ← –N(c,t)
Endloop
N(S(i),t) ← –b // S(i) label array index points now to the proper cluster label
return b //b is a proper label
End CLASSIFY1
```

```
                            // node j
    If j is not first in the inner For loop
    then
        If q ≠ s then //merge cluster fragments. q is a storage variable for the
                      // previous cluster fragment label
```

$N(s,t) \leftarrow N(s,t) + N(q,t)$
// Generalized EHK operations
$F^{(1)}(s,t) \leftarrow F^{(1)}(s,t) \oplus^{(r1)} F^{(1)}(q,t)$                //EHK    <4>
$F^{(2)}(s,t) \leftarrow F^{(2)}(s,t) \oplus^{(r2)} F^{(2)}(q,t)$                //EHK    <5>
................
$F^{(n)}(s,t) \leftarrow F^{(n)}(s,t) \oplus^{(rn)} F^{(n)}(q,t)$                //EHK    <6>
$N(q,t) \leftarrow -s$ //point to the proper cluster label s
//The following are commented examples of Generalized EHK operations
//these are regular scalar additions for the moments of x
//$F^{(1)}(s,t) \leftarrow F^{(1)}(s,t) + F^{(1)}(q,t)$                  //EHK
//$F^{(2)}(s,t) \leftarrow F^{(2)}(s,t) + F^{(2)}(q,t)$                  //EHK
................
//$F^{(n)}(s,t) \leftarrow F^{(n)}(s,t) + F^{(n)}(q,t)$                  //EHK
        Endif // if q = s cluster fragments are already merged, no further action
                   // is needed
    Endif
    $q \leftarrow s$ // set new node label to old
    Endloop
    $N(s) \leftarrow N(s,t) + 1$ // add the new node that merged the cluster fragments
                      //to the cluster count
    // Do generalized EHK operations for the node that merged the fragments
    //$F^{(1)}(s,t) \leftarrow F^{(1)}(s,t) \oplus^{(r1)} f^{(1)}(i)$  //EHK   <7>
    //$F^{(2)}(s,t) \leftarrow F^{(2)}(s,t) \oplus^{(r2)} f^{(2)}(i)$  //EHK   <8>
    ................
    //$F^{(n)}(s,t) \leftarrow F^{(n)}(s,t) \oplus^{(rn)} f^{(n)}(i)$  //EHK   <9>
    // commented generalized EHK operations for the node that merged the fragments
    //$F^{(1)}(s,t) \leftarrow F^{(1)}(s,t) + x$    //EHK
    //$F^{(2)}(s,t) \leftarrow F^{(2)}(s,t) + x^2$   //EHK
    ................
    //$F^{(n)}(s,t) \leftarrow F^{(n)}(s,t) + x^n$  //EHK
    Endif
Endloop
End Merge_cluster¹
CLASSIFY1(i,t) //identifies the proper cluster label for a given cluster label i and
                // cluster class t. Returns proper cluster label
$b \leftarrow S(i)$ //assign variable b site i label
$c \leftarrow b$ //assign variable c the value of b
$c \leftarrow -N(c,t)$ // get new value for c from the label array N
If c < 0 then
    return b //b is a proper label
$b \leftarrow c$
$c \leftarrow -N(c,t)$
if c< 0 then
    return b //b is a proper label
Loop until c<0//search for the proper label
    $b \leftarrow c$
    $c \leftarrow -N(c,t)$
Endloop
$N(S(i),t) \leftarrow -b$ // S(i) label array index points now to the proper cluster label
return b //b is a proper label
End CLASSIFY1

Appendix 2

// Example of Enhenced Unbounded HK (EUHK)
// comments marked by UHK denote UHK features beyond BBHK
// comments marked by EHK denote EHK shape features beyond BBHK
//This example is concerned with a two dimensional lattice that is unbounded
// along its length dimension. In this example the lattice is viewed as a continuous
//two dimensional image.
merge_cluster2 //example for the EUHK algorithm
S(2,R) //two dimensional array of size 2 x R, where R is the row size
    // S stores the sites' labels for scanned lines, row 1 stores all
    // even rows and row 2 all odd rows for the scanned lattice
T(2,R) //two dimensional array for temporary storage of site classes for
    // 2 scanned lines. It has the same dimensions as S. If an element of T is 0
    // then it belongs to the background class. The following illustration -continued Appendix 2

// show the shape of T and S

//even line

//odd line

// odd line
    //The above 2-dimnesional array represents a two row
    //scan window. Scanned even lines are stored in the top
    //row. Odd scanned lines are store in the bottom row
SET INTERRUPT=OFF //UHK When INTERRUPT is turned on by an
    // asynchronous process the execution of the program is terminated
// Initialization
For $J \leftarrow 1$ to $R$ // J is an array index that loops on all row pixels
$S(1,J) \leftarrow 0$ // zero row 1
$T(1,J) \leftarrow 0$ // zero row 1
End For
$I \leftarrow 1$ //I is a pointer to either row 1 or 2 of S and T. Its value is either 1 or 2
$II \leftarrow 1$ //II is a toggle that is either 1 or −1. It helps setting the proper values of I
$OI \leftarrow 1$ //OI is the previous line pointer of S and T
    // if I = 1 then OI = 2, if I = 2 then OI = 1
$IY \leftarrow 0$ //IY is a counter for the number of actual rows scanned, since the
    //beginning of the run. It denotes the Y position of a scanned pixel
    Do Forever //UHK, do row processing
$I \leftarrow I + II$
$II \leftarrow -II$
$IY \leftarrow IY + 1$
Read scanning device raw data for 1 scanned line
convert raw data into pixel data class and store in array row I of T
Set initial values for all k(t) label counters to their initial values for row I
//t is a class identifier. Each of the rows 1 or 2 has a different ranges of values for k(t)
    For $J \leftarrow 1$ To $R$ //Process row I, J denotes the x position of a pixel
      If $T(I,J) = 0$ Then Continue //This pixel does not require cluster analysis
      $p \leftarrow 0; s \leftarrow 0;$ //p and s are label variables
      $t \leftarrow T(I,J)$ //get pixel class and store it in variable t
      IF $T(I,J - 1) = t$ Then //check pixel class of the previous pixel on the
             //same row
        $s \leftarrow CLASSIFY1(S(I,J - 1),t)$ //get its proper label, CLASSIFY1 is defined in
           // Appendix 1
      EndIf
    IF $T(OI,J) = t$ Then // check adjacent pixel class on the previous row
        $p = CLASSIFY1(S(I,OI),t)$
    EndIf
      If $s = 0$ and $p = 0$ then //No adjacent pixels of class t found
        $k(t) \leftarrow k(t) + 1$ //increment counter because a new cluster fragment is found
        $N(k(t),t) \leftarrow 1$ //initialize values of label array element
        $X(k(t),t) \leftarrow J$ //EHK, initialize first x moment of X array element
        $XX(k(t),t) \leftarrow J^2$ //EHK, initialize second x moment of XX array element
        $Y(k(t),t) \leftarrow IY$ //EHK, initialize first y moment of Y array element
        $YY(k(t),t) \leftarrow IY^2$ //EHK, initialize second y moment of YY array element
    else
if $(s \ne 0$ and $p = 0)$//previous pixel is labeled
    or $(s = p)$ then //previous row adjacent pixel label is the same as
            //previous pixel's label
      $N(s,t) \leftarrow N(s,t) + 1$
      $X(s,t) \leftarrow X(s,t) + J$ //EHK, x first moment
      $XX(s,t) \leftarrow XX(s,t) + J^2$ //EHK, x second moment
      $Y(s,t) \leftarrow Y(s,t) + IY$ //EHK, y first moment
      $YY(s,t) \leftarrow YY(s,t) + IY^2$ //EHK, y second moment
else
if $( p \ne 0)$ then //adjecent row pixel is labeled
    if $(s \ne 0)$then //previous pixel is labeled
    //merge two subcluster and their parameters
    $N(s,t) \leftarrow N(p,t) + N(s,t) + 1$
    $X(s,t) \leftarrow X(p,t) + X(s,t) + J$ //EHK, get first moment for x coordinate
    $XX(s,t) \leftarrow XX(p,t) + XX(s,t) + J^2$ //EHK, get second moment for x coordinate
    $Y(s,t) \leftarrow Y(p,t) + Y(s,t) + IY$ //EHK, get first moment for y coordinate
    $YY(s,t) \leftarrow YY(p,t) + YY(s,t) + IY^2$ //EHK, get second moment for y coordinate
    $N(p,t) \leftarrow -s$
else //previous pixel is not labeled or not of the same class as the current one
If $p \notin group(I)$ then //belongs to the previous row label set and there is no
    //previous adjacent pixel label so we need to create a new proper cluster
    //label for the current row and point the old label to the new one
    $k(t) \leftarrow k(t) + 1$
    $N(k(t),t) \leftarrow N(p,t)$

Appendix 2

```
    N(p,t) ← -k(t)
    p ← k(t)
  EndIf
  N(p,t) ← N(p,t) + 1
  X(p,t) ← X(p,t) + J //EHK
  XX(p,t) ← XX(p,t) + J² //EHK
  Y(p,t) ← Y(p,t) + IY //EHK
  YY(p,t) ← YY(p,t) + IY² //EHK
EndIf
cluster(OI) //analyze all completed clusters up to the previous row
OI ← I
if INTERRUPT = ON then //UHK, after a raw is completed, we check
                      // for interrupts
    STOP    //UHK, Stop program execution
  EndIf //UHK
  End For Loop
End ForEver //UHK
cluster(I)//This procedure has UHK features that enable real time analysis of
    //clusters continuously. In this example both cluster populations and EHK
    //parameters such as cluster center of mass and moment of inertia are
    //analyzed. If an abnormal cluster parameters occurs, it alerts the system
for all pixel t classes
  for all proper cluster labels i ∈ group(I)
    CG ← (X(i,t)² + Y(i,t)²)/N(i,t) //EHK, CG is the squared sum of cluster X
        // and Y first moments divided by the cluster population count
    MI ← (XX(i,t) + YY(i,t)) - CG //EHK, MI is cluster moment of inertia
    if N(i,t) > N_max then //UHK, check for abnormal cluster size N_max
      if MI > MI_max then //UHK, EHK, check for abnormal cluster moment
          //of inertia MI_max
        alert(t,CG,N(i,t),MI) //UHK, EHK alerts system of cluster abnormality
      EndIf
    EndIf
    statistics(t,CG,N(i,t),MI) //collect statistics on intermediate cluster parameters
  End For
End procedure cluster
group(i)
  finds if a cluster label j belongs to row 1 or 2 of array S
  this is usally done by dividing the label value space in to two ranges. The
  bottom range is for odd rows and the top range is for even rows
End group
Stop_Program //UHK, This allows an unsynchronous termination of the program,
    //without this capability the program would run indefinately
  SET INTERRUPT=ON / UHK
End Stop_Program //UHK
Alert
  alert is a UHK procedure. It alerts the system of an abnormal cluster condition
  it can record the abnormal event and even end the scanning and stop the
  program
End Alert
Statisitcs
  collects cluster statistics for both BBHK and EHK parameters
End Statistics
```

Appendix 3

```
Merge_cluster3
//The following is pseudo code for the cluster analysis program
//using data structures given in Fig. 13.
//A general representaion of the data is provided by a graph G.
//the construct a → b denotes the value of b pointed by a
//In graph G, every node i is assigned a class T(i) array
//element.T is a one dimensional array. Its size is equal to the number of nodes in
// the graph. We assume here that the T array has been read into memory
// from some I/O device.
// comments marked by EHK denote new EHK features beyond BBHK.
//The labels used here are memory address of array prt_array.ptr_array is of the size
//of the graph. ptr_array is an array of pointers pointing to structure R instances. Each
//structure R instance hold cluster parameter information as described in Fig 14.
// R is defined by the following components: {t,N,F⁽¹⁾,F⁽²⁾,....,F⁽ⁿ⁾} t is the cluster
//class, N is the population counter and F⁽ⁿ⁾ are the generalized cluster parameters.
//The function address(p) gives the memory address of p. The function
//value(p) gives the value of the object pointed by p.
```

-continued

Appendix 3

```
// value(p) is either the address of an instance of R or a value of an element
// (which is an address) of ptr_array. In this pseudo code it is assumed that instances of R
// can be created through a New operator. It is assumed that when an R instance looses its
// pointer in the computation, the memory associated with the R instance is
// reclaimed through some mechanism of garbage collection.
//Intialization of variables
ptr ← adress(ptr_array(1)) // ptr is a label counter. Its value is incremented when a
            // a new cluster fragment is found. ptr is initialized
            // to the address of the first element of ptr_array, ptr_array
            // is a one dimensional array of pointers of the size of the graph
For all nodes i in a G Do
    S(i) ← −1 // mark all nodes in graph G as unvisited, S is a one dimensional array
            //of the size of the number of nodes in the graph. If it is marked −1 then
            // the node has not been processed yet by the program
Endloop
For all nodes i in G Do
    t ← T(i) //get node type for node i
    If there are no edges from i to j, or an edge from i to j exists
        such that (S(j) = −1 or t ≠ T(j)) //not visited or different class
        Then //adjacent nodes are not labeled, so we start a new cluster fragment
            S(i) ← ptr //label the first node of the cluster fragment
            value(ptr) ← New R //create a new structure instance R for label ptr and place
                        //it in ptr_array element whose address is ptr
            (value(ptr) → N) ← 1 //count this node
            (value(ptr) → t) ← t //EHK, set the cluster class to t
            // F⁽ⁿ⁾ represents a generalized cummulative
            // quantity it could be a scalar or none scalar quantity.
            // In this section of code we do EHK operations
            (value(ptr) → F⁽¹⁾) ← f⁽¹⁾(i) //EHK        <1>
            (value(ptr) → F⁽²⁾) ← f⁽²⁾(i) //EHK        <2>
            ...............
            (value(ptr) → F⁽ⁿ⁾) ← f⁽ⁿ⁾(i) //EHK        <3>
            ptr ← ptr + 1 //increment ptr to the next ptr_array element
Else
    For all edges from node i to nodes j such that (t = T(j) and S(j) ≠ −1) Do
        s ← CLASSIFY2(j)  // identifies the proper label of node j, s is a label of
                        // node j
        If j is not first in the inner For loop
        then
            If q ≠ s then //merge cluster fragments. q is a storage variable for the
                        // previous cluster fragment label
                (value(s) → N) ← (value(s) → N) + (value(q) → N)
                // Generalized EHK operations
                (value(s) → F⁽¹⁾) ← (value(s) → F⁽¹⁾) ⊕⁽ʳ¹⁾ (value(q) → F⁽¹⁾)   //EHK   <4>
                (value(s) → F⁽²⁾) ← (value(s) → F⁽²⁾) ⊕⁽ʳ²⁾ (value(q) → F⁽²⁾)   //EHK   <5>
                ...............
                (value(s) ← F⁽ⁿ⁾) ← (value(s) → F⁽ⁿ⁾) ⊕⁽ʳⁿ⁾ (value(q) → F⁽¹⁾)   //EHK   <6>
                value(q) ← s // point to the new proper cluster label s
            Endif // if q = s cluster fragments s are already merged, no further action
                    // is needed
        Endif
        q ← s // set new node label to old
    Endloop
    (value(s) → N) ← (value(s) → N) + 1 // add the new node that merged the cluster fragments
            //to the cluster count
    // Do generalized EHK operations for the node that merged the fragments
    (value(s) → F⁽¹⁾) ← (value(s) → F⁽¹⁾) ⊕⁽ʳ¹⁾ f⁽¹⁾(i)    //EHK        <7>
    (value(s) → F⁽²⁾) ← (value(s) → F⁽²⁾) ⊕⁽ʳ²⁾ f⁽²⁾(i)    //EHK        <8>
    ...............
    (value(s) → F⁽ⁿ⁾) ← (value(s) → F⁽ⁿ⁾) ⊕⁽ʳⁿ⁾ f⁽ⁿ⁾(i)    //EHK        <9>
    Endif
Endloop
End Merge_cluster3
CLASSIFY2(i) //identifies the proper cluster label for a given cluster label i
b ← S(i) //assign variable b site i label
c ← b //assign variable c the value of b
c ← value(c) // get a new value for c.
If c is not in the label range then //the label range are values of addresses from
            // the first to the last elements of ptr_array
    return b //b is a proper label because it points to an instance of R
b ← c
c ← value(c)
if c is not in the label range then
    return b // b is a proper label
Loop until c is not in the label range //search for the proper label
    b ← c
    c ← value(c)
```

-continued

Appendix 3

*Endloop*
*value*($S(i)$) ← b // $S(i)$ label pointer points now to the cluster proper label
*return* b //b is a proper label
*End CLASSIFY2*

Appendix 4

*Merge_cluster4*
//The following is pseudo code for the cluster analysis program
//using data structures of Fig. 14.
//A general representaion of the data is provided by a graph G.
// In graph G, every node i is assigned a class T(i) array
//element.T is a one imensional array. It size is equal to the number of nodes in
// the graph. We assume here that the graph and T arrays have been read into memory
// from some I/O device. An example of a class is a grey level. If two grey levels
// are considered, say black and white then the number of classes is two
// comments marked by EHK denote new EHK features beyond BBHK
// Included, but not specifically marked are also new EHK class features
//Intialization of variables
    k ← 0 // k a label counter. Its value is incremented when a
        // a new cluster fragment is found. At this point k is initialized to 0.
*For all nodes i in a G Do*
    $S(i)$ ← −1 // mark all nodes in graph G as unvisited, S is a one dimensional array
        //of the size of the number of nodes in the graph. If it is marked −1 then
        // the node has not been processed yet by the program
Endloop
*For all nodes i in G Do* // Do cluster analysis
    t ← $T(i)$ //get node type for node i
    *If there are no edges from i to j, or an edge from i to j exists*
        *such that ($S(j)$ = −1 or t ≠ $T(j)$)*
        *Then* //adjacent nodes are not labeled, so we start a new cluster fragment
            k ← k + 1 //increment label counter
            $S(i)$ ← k   //label the first node of the cluster fragment
            $N(k)$ ← 1 //count this node, N is a one dimensional array of the size of the graph
            $C(k)$ ← t //EHK, mark the class of this cluster
    //Do generalized HK operations. $F^{(n)}$ represents a generalized cummulative
        // quantity is could be a scalar or none scalar quantity. The dimensions of the
        // $F^{(n)}$ arrays is the same size as for the N array. $f^{(n)}(i)$ are calculated
        // quantities for vertice (site) i
    // In this section of code we do EHK operations
    $F^{(1)}(k)$ ← $f^{(1)}(i)$ //EHK    <1>
    $F^{(2)}(k)$ ← $f^{(2)}(i)$ //EHK    <2>
    ....................
    $F^{(n)}(k)$ ← $f^{(n)}(i)$ //EHK    <3>
    // the following are commented examples of generalized EHK operations
    //$F^{(1)}(k)$ ← $x(i)$ // initialize value for the first moment of x (EHK)
    //$F^{(2)}(k)$ ← $x(i)^{(2)}$ // initialize value for the second moment of x (EHK)
    ....................
    //$F^{(n)}(k)$ ← $x(i)^{(n)}$ //initialize value for the n'th moment of x (EHK)
*Else*
    *For all edges from node i to nodes j such that (t = $T(j)$ and $S(j)$ ≠ −1) Do*
        s ← *CLASSIFY(j)*  // identifies the proper label of node j, s is a label of
            // node j
    *If j is not first in the inner For loop*
    *then*
        *If q ≠ s then* //merge partial clusters. q is a storage variable for the
            // previous cluster fragment label
        $N(s)$ ← $N(s)$ + $N(q)$
        // Generalized EHK operations
        $F^{(1)}(s)$ ← $F^{(1)}(s)$ $\oplus^{(t1)}$ $F^{(1)}(q)$   //EHK            <4>
        $F^{(2)}(s)$ ← $F^{(2)}(s)$ $\oplus^{(t2)}$ $F^{(2)}(q)$   //EHK            <5>
        ...................
        $F^{(n)}(s)$ ← $F^{(n)}(s)$ $\oplus^{(tn)}$ $F^{(n)}(q)$   //EHK            <6>
        $N(q)$ ← −s //point to the proper cluster label s
        //The following are commented examples of Generalized EHK operations
        //these are regular scalar additions for the moments of x
        //$F^{(1)}(s)$ ← $F^{(1)}(s)$ + $F^{(1)}(q)$    //EHK
        //$F^{(2)}(s)$ ← $F^{(2)}(s)$ + $F^{(2)}(q)$    //EHK
        ....................
        //$F^{(n)}(s)$ ← $F^{(n)}(s)$ + $F^{(n)}(q)$    //EHK
        *Endif* // if q = s cluster fragments are already merged, no further action
            // is needed

Appendix 4
-continued

```
    Endif
    q ← s // set new node label to old
Endloop
N(s) ← N(s) + 1 // add the new node that merged the cluster fragments
                //to the cluster count
    // Do generalized EHK operations for the node that merged the fragments
    F⁽¹⁾(s) ← F⁽¹⁾(s) ⊕⁽ʳ¹⁾ f⁽¹⁾(i)   //EHK        <7>
    F⁽²⁾(s) ← F⁽²⁾(s) ⊕⁽ʳ²⁾ f⁽²⁾(i)   //EHK        <8>
    ..................
    F⁽ⁿ⁾(s) ← F⁽ⁿ⁾(s) ⊕⁽ʳⁿ⁾ f⁽ⁿ⁾(i)   //EHK        <9>
    // commented generalized EHK operations for the node that merged the fragments
    F⁽¹⁾(s) ← F⁽¹⁾(s) + x  //EHK
    F⁽²⁾(s) ← F⁽²⁾(s) + x²  //EHK
    ..................
    F⁽ⁿ⁾(s) ← F⁽ⁿ⁾(s) + xⁿ  //EHK
    Endif
Endloop
End Merge_cluster4
CLASSIFY(i) //identifies the proper cluster label for a given cluster label i and
            // cluster class t. Returns proper cluster label
b ← S(i) //assign variable b site i label
c ← b //assign variable c the value of b
c ← -N(c) // get new value for c from the label array N
If c < 0 then
    return b //b is a proper label
b ← c
c ← -N(c)
if c< 0 then
    return b // b is a proper label
Loop until c<0 // search for the proper label
    b ← c
    c ← -N(c)
Endloop
N(S(i)) ← -b // S(i) label array index points now to the proper label
return b //b is a proper label
End CLASSIFY
```

I claim:

1. An inspection and analysis system comprising:

a sensing system for sensing features in an object and providing digital signals representative thereof;

a programmed computer coupled to the sensing system, said computer being arranged to perform cluster analysis on data received from said sensing system, wherein said computer is programmed to employ an enhanced Hoshen-Kopelman with label reuse for identifying and labeling clusters concurrently for each of a plurality of data groups to detect and quantify cluster features in said data groups, and merge cluster shape feature properties for each of said data groups, thereby to detect and quantify cluster features other than cluster population; and an output device connected to indicate the identified and quantified cluster information developed from inspecting and analyzing the sensed object to a user of the system.

2. An inspection and analysis system comprising:

a sensing system for sensing features in an object and providing digital signals representative thereof;

a multi-processing programmed computer coupled to the sensing system, said computer being arranged to perform cluster analysis on data received from said sensing system, wherein said computer is programmed to employ an unbounded Hoshen-Kopelman algorithm with label reuse to identify and label clusters concurrently for each of a plurality of data groups to detect and quantify cluster features in said data groups, and to merge cluster shape feature properties for each of said data groups thereby to permit the substantially continuous inspection and analysis of said object; and an output device connected to indicate the identified and quantified cluster information developed from inspecting and analyzing the sensed object to a user of the system.

3. A method for extracting cluster shape feature properties of a d-dimensional image that can be unbounded in a first dimension wherein said image consisting of one or more classes containing sites selected from the group consisting of pixels and voxels comprising the steps of:

(a) inputting an image section j of said image;

(b) determining class type t of site i in image section j;

(c) identifying zero or more distinct p proper cluster labels $k_1, \ldots, k_p$ of labeled sites adjacent and of the same class type t as site i using a capability of a basic bounded Hoshen-Kopelman algorithm with label reuse for identifying proper labels of clusters;

(d) calculating scalar and non-scalar image m site properties $f^{(n)}(i)$ for site i where $n=1,2,\ldots,m$;

(e) if p=0 computing for all $n=1,2,\ldots,m$ $F^{(n)}(k)=f^{(n)}(i)$ and $C(k)=t$ wherein $F^{(n)}(k)$ is a cluster shape feature property of a cluster fragment of the same mathematical type as $f^{(n)}(i)$, $C(k)$ is a cluster class type identifier and k is a cluster proper label selected using a basic bounded Hoshen-Kopelman algorithm with label reuse capability for selecting a cluster proper label when p=0;

(f) if p>0
computing for all n=1,2, ... ,m $$F^{(n)}(k) = F^{(n)}(k_1) \oplus^{(n)} \ldots \oplus^{(n)}(k_p) \oplus^{(n)} f^{(n)}(i)$$

wherein $\oplus^{(n)}$ is binary associative and commutative operator that operates on said $f^{(n)}(i)$ and cluster feature shape properties $F^{(n)}(k_1), \ldots, F^{(n)}(k_p)$ of the same mathematical type as $f^{(n)}(i)$ and $F^{(n)}(k)$ and k is a cluster proper label selected using a capability of the Hoshen-Kopelman algorithm with label reuse for selecting a cluster proper label when p>0;

(g) repeating steps (a), (b), (c), (d), (e) and (f) for all sites in image section j;

(h) outputting of all the determined $F^{(n)}(k,)$ cluster feature shape properties for
  i. each labeled cluster extending up to the image section previous to image section j and
  ii. each labeled cluster and labeled cluster fragment extending into image section j;

(i) stopping if processing of said image is interrupted;

(j) stopping if a number of contiguous image sections to be processed is defined and if said number is equal to the number of already processed image sections of said image; and (k) repeating steps (a), (b), (c), (d), (e), (f), (h), (i) and (j) for the next image section j of said image.

4. The method according to claim 3 wherein for n=1 $\oplus^{(n)}$ is a scalar addition operator and if the said image is bounded and consists of two or more classes $f^{(n)}(i)$ is set to 1 and $F^{(n)}(k)$ is a cluster population count.

5. The method according to claim 3 wherein for n=1 $\oplus^{(n)}$ is a scalar addition operator and if said image is unbounded $f^{(n)}(i)$ is set to 1 and (k) is a cluster population count.

6. The method according to claim 3 wherein
$\oplus^{(n)}$ is a scalar addition operator for n=1, ... ,9

$f^{(n)}(i)$ is set to $x_i$, the x coordinate of site i, and $F^{(n)}(k)$ is a first cluster moment for n=1

$f^{(n)}(i)$ is set to $y_i$, they coordinate of site i, and $F^{(n)}(k)$ is a first cluster moment for n=2

$f^{(n)}(i)$ is set to $z_i$, the z coordinate of site i, and $F^{(n)}(k)$ is a first cluster moment for n=3

$f^{(n)}(i)$ is set to $x_i^2$ and $F^{(n)}(k)$ is a second cluster moment for n=4

$f^{(n)}(i)$ is set to $y_i^2$ and $F^{(n)}(k)$ is a second cluster moment for n=5

$f^{(n)}(i)$ is set to $z_i^2$ and $F^{(n)}(k)$ is a second cluster moment for n=6

$f^{(n)}(i)$ is set to $x_i y_i$ and $F^{(n)}(k)$ is a second cluster moment for n=7

$f^{(n)}(i)$ is set to $x_i z_i$ and $F^{(n)}(k)$ is a second cluster moment for n=8

$f^{(n)}(i)$ is set to $y_i z_i$ and $F^{(n)}(k)$ is a second cluster moment for n=9.

7. The method according to claim 3 wherein
$\oplus^{(n)}$ is a scalar addition operator $f^{(n)}(i)$ is set to the product quantity $$\prod_{r=1}^{d} x_r^{m(r)}(i)$$

where $x_r(i)$ are the r'th coordinates of the i'th site in d dimensions raised to the power m(r), so that $F^{(n)}(k)$ is a cluster moment for n=1.

8. The method of claim 3 wherein
for n=1 $f^{(n)}(i)$ is set to the $x_r(i)$ r'th coordinate of the i'th site, $F^{(n)}(k)$ is a maximum cluster coordinate value for the coordinate $x_r$, and $\oplus^{(n)}$ corresponds to picking the maximum value of two operands to which $\oplus^{(n)}$ is applied;

and for n=2
$f^{(n)}(i)$ is set to the $x_r(i)$ r'th coordinate of the i'th site, $F^{(n)}(k)$ is a minimum cluster coordinate value for the coordinate $x_r$, and $\oplus^{(n)}$ corresponds to picking the minimum value of two operands to which $\oplus^{(n)}$ is applied.

9. The method according to claim 3 wherein step (h) further comprises outputting a fault alert and stopping cluster shape feature extraction if one or more of said $F^{(n)}(k)$ properties is determined to extend beyond a predetermined tolerance.

10. The method according to claim 3 wherein for n=1 $f^{(n)}(i)$ set to 1 if all sites that are neighbors of site i belong to the same class as site i, and otherwise, $f^{(n)}(i)$ is set to 0, $F^{(n)}(k)$ is a cluster perimeter sites count and $\oplus^{(n)}$ is a scalar addition operator.

11. The method according to claim 3 wherein for n=1
$\oplus^{(n)}$ is a scalar addition operator $f^{(n)}(i)$ is the number of edges from site i to its neighbor sites that have already been labeled and of the same class type as site i $F^{(n)}(k)$ is a cluster edge count of edges between sites belonging to said cluster;

and for n=2
$\oplus^{(n)}$ is a scalar addition operator $f^{(n)}(i)$ is the number of edges from site i to its neighbor sites that that have already been labeled and not of the same class type as site i $F^{(n)}(k)$ is a cluster edge count between sites of cluster k to adjacent sites not belonging to cluster k.

12. The method according to claim 3 wherein for n=1 $\oplus^{(n)}$ is a scalar addition operator $f^{(n)}(i)$ is set to an image property g(i) for site i and $F^{(n)}k$ is a cumulative cluster property for g(i).

13. A method for extracting cluster shape feature properties in a d-dimensional image that can be unbounded in a first dimension wherein said image consisting of one or more classes containing sites of one or more classes represented by vectors contained within cells comprising the steps of (a) inputting an image section j of said cells of said image;

(b) determining class type t of site i in cell q in image section j;

(c) identifying zero or more distinct p proper cluster labels $k_1, \ldots, k_p$ of labeled adjacent sites in adjacent cells and of the same class type t as site i using a capability of a basic bounded Hoshen-Kopelman algorithm with label reuse for identifying proper labels of clusters;

(d) calculating scalar and non-scalar image m site properties $f^{(n)}(i)$ for site i where n=1,2, ... ,m;

(e) if p=0
computing for all n=1,2, ... ,m
$F^{(n)}(k)=f^{(n)}(i)$ and $C(k)=t$
wherein $F^{(n)}(k)$, is a cluster shape feature property of a cluster fragment of the same mathematical type as $f^{(n)}(i)$, $C(k)$ is a cluster class type identifier and k is a cluster proper label selected using a basic bounded Hoshen-Kopelman algorithm with label reuse capability for selecting a cluster proper label when p=0;

(f) if p>0
computing for all n=1,2, ... ,m $$F^{(n)}(k)=F^{(n)}(k_1)\oplus^{(n)} \ldots \oplus^{(n)} F^{(n)}(k_p)\oplus^{(n)} f^{(n)}(i)$$

wherein $\oplus^{(n)}$ is binary associative and commutative operator that operates on said $f^{(n)}(i)$ and cluster feature shape properties $F^{(n)}(k_1), \ldots, F^{(n)}(k_p)$ of the same mathematical type as $f^{(n)}(i)$ and $F^{(n)}(k)$ and k is a cluster proper label selected using a capability of the Hoshen-Kopelman algorithm with label reuse for selecting a cluster proper label when p>0;

(g) repeating steps (a), (b), (c), (d), (e) and (f) for all sites belonging to all cells in image section j;

(h) outputting of all the determined $F^{(n)}(k)$ cluster feature shape properties for
   i. each labeled cluster extending up to the image section previous to image section j and
   ii. each labeled cluster and labeled cluster fragment extending into image section j;

(i) stopping if processing of said image is interrupted;

(j) stopping if a number of contiguous image sections to be processed is defined and if said number is equal to the number of already processed image sections of said image; and (k) repeating steps (a), (b), (c), (d), (e), (f), (h), (i) and (j) for the next image section j of said image.

14. An apparatus for extracting cluster shape feature properties of a d-dimensional image that can be unbounded in a first dimension wherein said image consisting of one or more classes containing sites selected from the group consisting of pixels and voxels comprising:

(a) means for inputting an image section j of said image;

(b) means for determining class type t of site i in image section j;

(c) means for identifying zero or more distinct p proper cluster labels $k_1, \ldots, k_p$ of labeled sites adjacent and of the same class type t as site i using a capability of a basic bounded Hoshen-Kopelman algorithm with label reuse for identifying proper labels of clusters;

(d) means for calculating scalar and non-scalar image m site properties $f^{(n)}(i)$ for site i where n=1,2, ... ,m;

(e) if p=0
means for computing for all n=1,2, ... ,m
$F^{(n)}(k)=f^{(n)}(i)$ and $C(k)=t$
wherein $F^{(n)}(k)$ is a cluster shape feature property of a cluster fragment of the same mathematical type as $f^{(n)}(i)$, $C(k)$ is a cluster class type identifier and k is a cluster proper label selected using a basic bounded Hoshen-Kopelman algorithm with label reuse capability for selecting a cluster proper label when p=0;

(f) if p>0
means for computing for all n=1,2, ... ,m $$F^{(n)}(k)=F^{(n)}(k_1)\oplus^{(n)} \ldots \oplus^{(n)} F^{(n)}(k_p)\oplus^{(n)} f^{(n)}(i)$$

wherein $\oplus^{(n)}$ is binary associative and commutative operator that operates on said $f^{(n)}(i)$ and cluster feature shape properties $F^{(n)}(k_1), \ldots, F^{(n)}(k_p)$ of the same mathematical type as $f^{(n)}(i)$ and $F^{(n)}(k)$ and k is a cluster proper label selected using a capability of the Hoshen-Kopelman algorithm with label reuse for selecting a cluster proper label when p>0;

(g) means for repeating (a), (b), (c), (d), (e) and (f) for all sites in image section j;

(h) means for outputting of all the determined $F^{(n)}(k)$ cluster feature shape properties for
   i. each labeled cluster extending up to the image section previous to image section j and
   ii. each labeled cluster and labeled cluster fragment extending into image section j;

(i) means for stopping if processing of said image is interrupted;

(j) means for stopping if a number of contiguous image sections to be processed is defined and if said number is equal to the number of already processed image sections of said image; and (k) means of repeating (a), (b), (c), (d), (e), (f), (h), (i) and (j) for the next image section j of said image.

15. The apparatus according to claim 14 wherein for $n=1 \oplus^{(n)}$ is a scalar addition operator and if the said image is bounded and consists of two or more classes $f^{(n)}(i)$ is set to 1 and $F^{(n)}(k)$ is a cluster population count.

16. The apparatus according to claim 14 wherein for $n=1^{(n)}$ is a scalar addition operator and if said image is unbounded $f^{(n)}(i)$ is set to 1, and $F^{(n)}(k)$ is a cluster population count.

17. The apparatus according to claim 14 wherein
$\oplus^{(n)}$ is a scalar addition operator for n=1, ... ,9
$f^{(n)}(i)$ is set to $x_i$, the x coordinate of site i, and $F^{(n)}(k)$ is a first cluster moment for n=1
$f^{(n)}(i)$ is set to $y_i$, they coordinate of site i, and $F^{(n)}(k)$ is a first cluster moment for n=2
$f^{(n)}(i)$ is set to $z_i$, the z coordinate of site i, and $F^{(n)}(k)$ is a first cluster moment for n=3
$f^{(n)}(i)$ is set to $x_i^2$ and $F^{(n)}(k)$ is a second cluster moment for n=4
$f^{(n)}(i)$ is set to $y_i^2$ and $F^{(n)}(k)$ is a second cluster moment for n=5
$f^{(n)}(i)$ is set to $z_i^2$ and $F^{(n)}(k)$ is a second cluster moment for n=6
$f^{(n)}(i)$ is set to $x_i y_i$ and $F^{(n)}(k)$ is a second cluster moment for n=7
$f^{(n)}(i)$ is set to $x_i z_i$ and $F^{(n)}(k)$ is a second cluster moment for n=8
$f^{(n)}(i)$ is set to $y_{zi}$ and $F^{(n)}(k)$ is a second cluster moment for n=9.

18. The apparatus according to claim 14 wherein
$\oplus^{(n)}$ is a scalar addition operator
$f^{(n)}(i)$ is set to the product quantity $$\prod_{r=1}^{d} x_r^{m(r)}(i)$$

where $x_r(i)$ are the r'th coordinates of the i'th site in d dimensions raised to the power m(r), so that $F^{(n)}(k)$ is a cluster moment for n=1.

19. The apparatus according to claim 14 wherein
for n=1 $f^{(n)}(i)$ is set to the $x_r(i)$ r'th coordinate of the i'th site,
$F^{(n)}(k)$ is a maximum cluster coordinate value for the coordinate $x_r$ and $\oplus^{(n)}$ corresponds to picking the maximum value of two operands to which $\oplus^{(n)}$ is applied;

and for n=2

$f^{(n)}(i)$ is set to the $x_r(i)$ r'th coordinate of the i'th site, $F^{(n)}(k)$ is a minimum cluster coordinate value for the coordinate $x_r$, and $\oplus^{(n)}$ corresponds to picking the minimum value of two operands to which $\oplus^{(n)}$ is applied.

20. The apparatus according to claim 14 wherein said means (h) further includes means for outputting a fault alert and stopping if one or more of said $F^{(n)}(k)$ properties is determined to extend beyond a predetermined tolerance.

21. The apparatus according to claim 14 wherein for n=1 $f^{(n)}(i)$ is set to 1 if all sites that are neighbors of site i belong to the same class as site i, and otherwise, $f^{(n)}(i)$ is set to 0, $F^{(n)}(k)$ is a cluster perimeter sites count and $\oplus^{(n)}$ is a scalar addition operator.

22. The apparatus according to claim 14 wherein for n=1 $\oplus^{(n)}$ is a scalar addition operator $f^{(n)}(i)$ is set to an image property g(i) for site i and $F^{(n)}(k)$ is a cumulative cluster property for g(i).

* * * * *